US010455132B2

(12) United States Patent
Ota

(10) Patent No.: US 10,455,132 B2
(45) Date of Patent: Oct. 22, 2019

(54) COMMUNICATION APPARATUS, CONTROL METHOD THEREOF, IMAGE CAPTURING APPARATUS, IMAGE CAPTURING SYSTEM, AND STORAGE MEDIUM

(71) Applicant: CANON KABUSHIKI KAISHA, Tokyo (JP)

(72) Inventor: Tomohiro Ota, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 217 days.

(21) Appl. No.: 15/622,298

(22) Filed: Jun. 14, 2017

(65) Prior Publication Data

US 2017/0366732 A1    Dec. 21, 2017

(30) Foreign Application Priority Data

Jun. 21, 2016  (JP) .................................. 2016-122878

(51) Int. Cl.
*H04N 5/232*  (2006.01)

(52) U.S. Cl.
CPC ..... *H04N 5/23203* (2013.01); *H04N 5/23206* (2013.01); *H04N 5/23216* (2013.01); *H04N 5/23293* (2013.01); *H04N 5/232061* (2018.08); *H04N 5/232939* (2018.08)

(58) Field of Classification Search
CPC ............. H04N 1/00114; H04N 1/0041; H04N 5/23203; H04N 5/23206; H04N 5/232061; H04N 5/23216; H04N 5/23293; H04N 5/232933; H04N 5/232939; H04N 5/232941; G08B 13/19684
See application file for complete search history.

(56) References Cited

U.S. PATENT DOCUMENTS

| | | | | |
|---|---|---|---|---|
| 9,325,770 | B2* | 4/2016 | Cho | G06F 3/0482 |
| 9,525,828 | B2* | 12/2016 | Won | H04N 5/2628 |
| 2003/0025802 | A1* | 2/2003 | Mayer, Jr. | G03B 7/12 |
| | | | | 348/211.99 |
| 2003/0081009 | A1* | 5/2003 | Seo | H04N 5/23293 |
| | | | | 715/812 |
| 2015/0138396 | A1* | 5/2015 | Sako | H04N 5/23216 |
| | | | | 348/231.6 |

FOREIGN PATENT DOCUMENTS

JP            2003224757 A        8/2003

* cited by examiner

*Primary Examiner* — Lin Ye
*Assistant Examiner* — Chriss S Yoder, III
(74) *Attorney, Agent, or Firm* — Venable LLP

(57) ABSTRACT

A communication apparatus comprises: a communication unit for communication with an image capturing apparatus including a display unit; an input unit configured to input a setting change request to the image capturing apparatus; and a control unit configured to control the communication unit to transmit, to the image capturing apparatus, second information to be highlighted together with first information indicating contents of the setting change request so as to highlight a display element related to the setting change request when displayed in the display unit of the image capturing apparatus in a case where the contents of the setting change request meet a predetermined condition, and control the communication unit to transmit the first information to the image capturing apparatus without transmitting the second information in a case where the contents of the setting change request do not meet the predetermined condition.

15 Claims, 14 Drawing Sheets

COMMUNICATION APPARATUS, CONTROL METHOD THEREOF, IMAGE CAPTURING APPARATUS, IMAGE CAPTURING SYSTEM, AND STORAGE MEDIUM

BACKGROUND OF THE INVENTION

Field of the Invention

The present invention relates to a communication apparatus, a control method thereof, an image capturing apparatus, an image capturing system, and a storage medium.

Description of the Related Art

In general, a user of a digital camera can make a setting or adjustment concerning shooting such as exposure or white balance by operating keys or a touch panel arranged in a main body, and perform the shooting on a predetermined shooting condition. On the other hand, there is also known a system capable of connecting a camera and a remote control device by a wire or wirelessly, and making the setting or adjustment of a shooting condition from the remote control device. The remote control device used together with the camera is useful when, for example, roles are divided by a cameraman concentrating on focusing and framing, and an assistant operating another setting in a film making site where shooting is performed by a plurality of people.

There is known a technique of, by operating a remote control device used together with a camera, moving a cursor controlled by a connection destination camera to select a setting item and changing a camera setting (Japanese Patent Laid-Open No. 2003-224757). When the cursor is placed in a setting item with a disabled function, the technique disclosed in Japanese Patent Laid-Open No. 2003-224757 can display an icon with blinking in a display unit on a camera side and notify a cameraman that a setting change is made to the disabled function.

There may be a case in which the assistant operating the remote control device wants to notify the cameraman concentrating on focusing and framing of contents such as a setting change and adjustment made in the remote control device with an emphasis on them. A case is given as an example in which when changing exposure, the assistant wants to clearly inform the cameraman that the change is made in shutter speed, f-number, or gain. This is for making the cameraman aware that he should beware of camera shaking more if the setting change made by the assistant is lowering a shutter speed or that he should pay more attention to focusing if the change is setting a stopped-down aperture state. On the other hand, a case is also considered in which the assistant does not want to notify, on purpose, the cameraman of the setting change with an emphasis on it in order to make him concentrate on his own duty. For example, no special problem is posed even if the cameraman is not clearly notified of a fine adjustment in white balance. It is therefore desirable that the assistant purposely avoids a notification that interferes with the concentration of the cameraman.

In another situation, there is a case in which shooting is performed while a movie director checks, with an external monitor, a video signal which is a live view output from a camera. In this case, it is considered that even if a setting change is made, the movie director need not be notified of a setting change, with a particular emphasis, that has been scheduled in a prior shooting plan. In contrast to this case, it is desirable that the movie director is notified of, for example, a specific setting change that is not planned with an emphasis on it so that he can be aware of the setting change.

Concerning these problems, Japanese Patent Laid-Open No. 2003-224757 does not consider a technique of controlling whether to notify the user of the connection destination camera of a specific setting change made in the remote control device.

SUMMARY OF THE INVENTION

The present invention has been made in consideration of the aforementioned problems, and realizes a technique capable of, when the setting of an image capturing apparatus is changed from a communication apparatus, notifying a user side of the image capturing apparatus of only a desired setting item out of changed setting items.

In order to solve the aforementioned problems, one aspect of the present invention provides a communication apparatus comprising: a communication unit for communication with an image capturing apparatus including a display unit; an input unit configured to input a setting change request to the image capturing apparatus; and a control unit configured to control the communication unit to transmit, to the image capturing apparatus, second information to be highlighted together with first information indicating contents of the setting change request so as to highlight a display element related to the setting change request when displayed in the display unit of the image capturing apparatus in a case where the contents of the setting change request meet a predetermined condition, and control the communication unit to transmit the first information to the image capturing apparatus without transmitting the second information in a case where the contents of the setting change request do not meet the predetermined condition.

Another aspect of the present invention provides, a communication apparatus comprising: a communication unit for communication with an image capturing apparatus including a display unit; an input unit configured to input a setting change request to the image capturing apparatus; and a control unit configured to control to highlight a display element related to the setting change request when displayed in the display unit of the image capturing apparatus in a case where a predetermined condition is met and control the communication unit to transmit, to the image capturing apparatus, first information indicating the predetermined condition about contents of the setting change request for the display element not to be highlighted in a case where the predetermined condition is not met together with second information indicating the contents of the setting change request.

Still another aspect of the present invention provides, a control method of a communication apparatus having a communication unit configured to communicate with an image capturing apparatus including a display unit, the method comprising: inputting a setting change request to the image capturing apparatus; and controlling the communication unit to transmit, to the image capturing apparatus, second information to be highlighted together with first information indicating contents of the setting change request so as to highlight a display element related to the setting change request when displayed in the display unit of the image capturing apparatus in a case where the contents of the setting change request meet a predetermined condition, and controlling the communication unit to transmit the first information to the image capturing apparatus without transmitting the second information in a case where the contents of the setting change request do not meet the predetermined condition.

Yet another aspect of the present invention provides, a control method of a communication apparatus having a communication unit for communication with an image capturing apparatus including a display unit, the method comprising: inputting a setting change request to the image capturing apparatus; and controlling to highlight a display element related to the setting change request when displayed in the display unit of the image capturing apparatus in a case where a predetermined condition is met and controlling the communication unit to transmit, to the image capturing apparatus, first information indicating the predetermined condition about contents of the setting change request for the display element not to be highlighted in a case where the predetermined condition is not met together with second information indicating the contents of the setting change request.

Still yet another aspect of the present invention provides, a non-transitory computer-readable storage medium storing a program for causing a computer to execute a control method of a communication apparatus having a communication unit for communication with an image capturing apparatus including a display unit, the method comprising: inputting a setting change request to the image capturing apparatus; and controlling the communication unit to transmit, to the image capturing apparatus, second information to be highlighted together with first information indicating contents of the setting change request so as to highlight a display element related to the setting change request when displayed in the display unit of the image capturing apparatus in a case where the contents of the setting change request meet a predetermined condition, and controlling the communication unit to transmit the first information to the image capturing apparatus without transmitting the second information in a case where the contents of the setting change request do not meet the predetermined condition.

Yet still another aspect of the present invention provides, an image capturing apparatus comprising: an image capturing unit; a display unit; a reception unit configured to receive information transmitted from a communication apparatus; and a processing unit configured to make a setting change based on first information indicating contents of a setting change request and highlight the setting change in the display unit in a case where the reception unit receives second information together with the first information when receiving the first information, and make a setting change based on the first information indicating the contents of the setting change request without highlighting the setting change in the display unit in a case where the reception unit does not receive the second information together with the first information when receiving the first information.

Still yet another aspect of the present invention provides, an image capturing system comprising a communication apparatus and an image capturing apparatus communicable with the communication apparatus, wherein the communication apparatus comprises: a communication unit for communication with the image capturing apparatus including a display unit; an input unit configured to input a setting change request to the image capturing apparatus; and a control unit configured to control the communication unit to transmit, to the image capturing apparatus, second information to be highlighted together with first information indicating contents of the setting change request so as to highlight a display element related to the setting change request when displayed in the display unit of the image capturing apparatus in a case where the contents of the setting change request meet a predetermined condition, and control the communication unit to transmit the first information to the image capturing apparatus without transmitting the second information in a case where the contents of the setting change request do not meet the predetermined condition; and wherein the image capturing apparatus comprises: an image capturing unit; a display unit; a reception unit configured to receive information transmitted from the communication apparatus; and a processing unit configured to make a setting change based on first information indicating contents of a setting change request and highlight the setting change in the display unit in a case where the reception unit receives second information together with the first information when receiving the first information, and make a setting change based on the first information indicating the contents of the setting change request without highlighting the setting change in the display unit in a case where the reception unit does not receive the second information together with the first information when receiving the first information.

Yet still another aspect of the present invention provides, an image capturing apparatus comprising: an image capturing unit; a display unit; a reception unit configured to receive information transmitted from a communication apparatus; and a processing unit configured to process so as to highlight a display element related to a setting change request in the display unit in a case where a predetermined condition about contents of a setting change request received by the reception unit is met and so as not to highlight the display element in the display unit in a case where the predetermined condition is not met when the reception unit receives second information indicating the contents of the setting change request in a case where the reception unit receives first information indicating the predetermined condition.

Still yet another aspect of the present invention provides, an image capturing system comprising a communication apparatus and an image capturing apparatus communicable with the communication apparatus, wherein the communication apparatus comprises: a communication unit for communication with the image capturing apparatus including a display unit; an input unit configured to input a setting change request to the image capturing apparatus; and a control unit configured to control to highlight a display element related to the setting change request when displayed in the display unit of the image capturing apparatus in a case where a predetermined condition is met and control the communication unit to transmit, to the image capturing apparatus, first information indicating the predetermined condition about contents of the setting change request for the display element not to be highlighted in a case where the predetermined condition is not met together with second information indicating the contents of the setting change request; and wherein the image capturing apparatus comprises: an image capturing unit; a display unit; a reception unit configured to receive information transmitted from the communication apparatus; and a processing unit configured to process so as to highlight a display element related to a setting change request in the display unit in a case where a predetermined condition about contents of a setting change request received by the reception unit is met and so as not to highlight the display element in the display unit in a case where the predetermined condition is not met when the reception unit receives second information indicating the contents of the setting change request in a case where the reception unit receives first information indicating the predetermined condition.

Yet still another aspect of the present invention provides, a non-transitory computer-readable storage medium storing a program for causing a computer to execute a control method of an image capturing apparatus comprising an image capturing unit and a display unit, the method comprising: receiving information transmitted from a communication apparatus; and processing so as to make a setting change based on first information indicating contents of a setting change request and highlight the setting change in the display unit in a case where second information is received together with the first information when the first information is received in the receiving, and make a setting change based on the first information indicating the contents of the setting change request without highlighting the setting change in the display unit in a case where the second information is not received together with the first information when the first information is received in the receiving.

Still yet another aspect of the present invention provides, a non-transitory computer-readable storage medium storing a program for causing a computer to function as each unit of an image capturing system comprising a communication apparatus and an image capturing apparatus communicable with the communication apparatus, wherein the communication apparatus comprises: a communication unit for communication with the image capturing apparatus including a display unit; an input unit configured to input a setting change request to the image capturing apparatus; and a control unit configured to control the communication unit to transmit, to the image capturing apparatus, second information to be highlighted together with first information indicating contents of the setting change request so as to highlight a display element related to the setting change request when displayed in the display unit of the image capturing apparatus in a case where the contents of the setting change request meet a predetermined condition, and control the communication unit to transmit the first information to the image capturing apparatus without transmitting the second information in a case where the contents of the setting change request do not meet the predetermined condition; and wherein the image capturing apparatus comprises: an image capturing unit; a display unit; a reception unit configured to receive information transmitted from the communication apparatus; and a processing unit configured to make a setting change based on first information indicating contents of a setting change request and highlight the setting change in the display unit in a case where the reception unit receives second information together with the first information when receiving the first information, and make a setting change based on the first information indicating the contents of the setting change request without highlighting the setting change in the display unit in a case where the reception unit does not receive the second information together with the first information when receiving the first information.

According to the present invention, it becomes possible, when the setting of the image capturing apparatus is changed from the communication apparatus, to notify the user side of the image capturing apparatus of only the desired setting item out of the changed setting items.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 4A, 4B-1 and 4B-2 are flowcharts showing a series of operations of setting change processing in the tablet terminal according to the first embodiment;

FIGS. 6A-1 and 6A-2 are flowcharts showing a series of operations of setting change processing in a tablet terminal according to the second embodiment;

FIGS. 6B-1 and 6B-2 are flowcharts showing a series of operations of setting change processing in a video camera according to the second embodiment.

DESCRIPTION OF THE EMBODIMENTS

First Embodiment (Arrangement of Image Capturing System)

Figure 1:
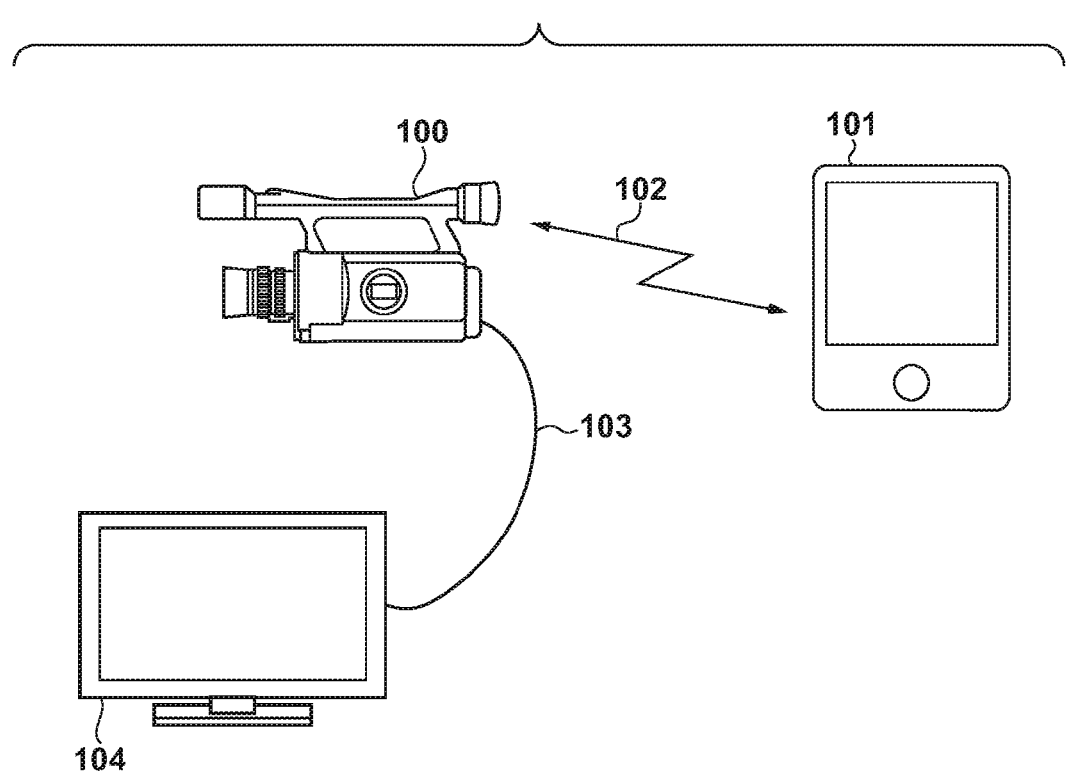
FIG. 1 is a view showing an example of the arrangement of an image capturing system according to an embodiment of the present invention.

FIG. 1 shows an example of the arrangement of an image capturing system according to this embodiment. The image capturing system according to this embodiment is constituted by, for example, a tablet terminal (to be simply referred to as a tablet) 101, a video camera 100 (digital camera) which cooperates with the tablet 101 by wireless communication 102, and a monitor 104 connected to the video camera 100 by an SDI cable 103. The tablet 101 indicates an example of a communication apparatus according to this embodiment, and the video camera 100 indicates an example of an image capturing apparatus according to this embodiment. A case will be described as an example in which, for example, Wi-Fi® is used for the wireless communication 102 in this embodiment. However, another communication system may be used. For example, Bluetooth® or a unique wireless communication system may be used as a substitute. Alternatively, wired communication may be used instead of the wireless communication. That is, RS-232C, RS-422A, USB, Ethernet®, LANC®, or the like can be executed regardless of communication system.

Figure 2:
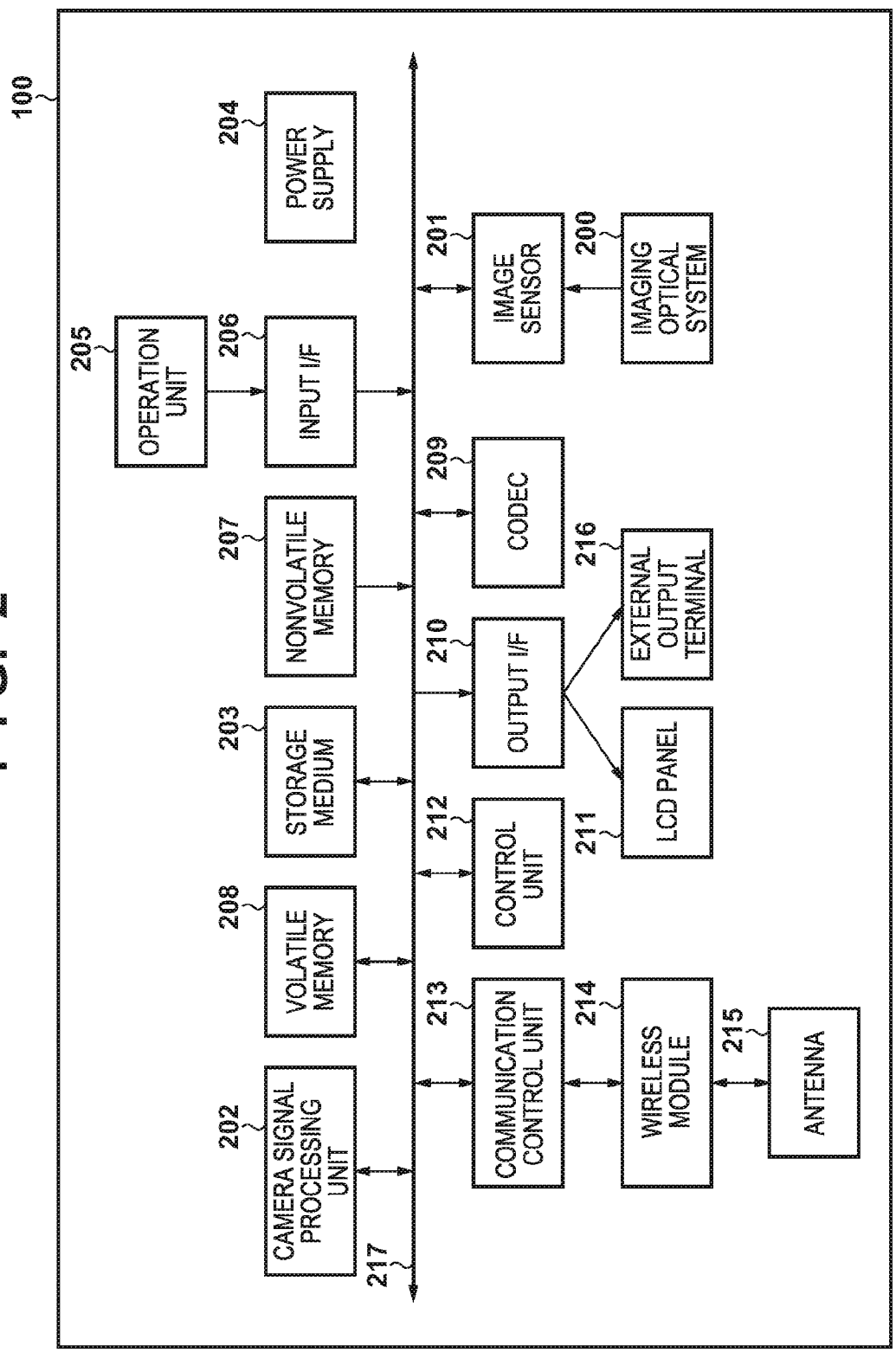
FIG. 2 is a block diagram showing an example of the functional arrangement of a video camera as an example of an image capturing apparatus according to this embodiment.

FIG. 2 is a block diagram showing an example of the functional arrangement of the video camera 100. Respective units that constitute the video camera 100 are controlled by programs operating in a control unit 212 and input/output data mutually via a data bus 217.

An imaging optical system 200 is an imaging lens group which includes a focus, an aperture mechanism, and the like and forms the optical image of an object. An image sensor 201 includes, for example, an A/D converter and a photo-electric conversion unit made of a CMOS, converts an optical image input from the imaging optical system 200 into an analog electrical signal, and then converts it into a digital signal (video data). Note that the photoelectric conversion unit is not limited to the CMOS, but another photoelectric conversion unit such as a CCD may be formed.

A camera signal processing unit 202 performs, on the video data output from the image sensor 201, predetermined resizing processing such as pixel interpolation/reduction, color conversion, various types of correction processing, or the like. The signal output from the camera signal processing unit 202 is compression-encoded in a predetermined format at a predetermined bit rate by a CODEC 209 to be described later. A storage medium 203 stores video data output from the CODEC 209 and metadata associated with the video data. A power supply 204 includes an AC power supply or a battery and supplies power needed for the respective units of the video camera 100.

An operation unit 205 includes a switch for performing the ON/OFF control of the power supply 204 in the video camera 100, and a pointing device such as a 4-way selector or a touch panel. Operation information accepted by the operation unit 205 is input to the control unit 212 via an input I/F 206 and the data bus 217.

A nonvolatile memory 207 includes, for example, a semiconductor memory such as an EEPROM and stores a program for controlling the video camera 100. The nonvolatile memory 207 also stores an HTTP server program and a Web application for a Web browser operating in the tablet 101 to execute.

A volatile memory 208 includes, for example, a semiconductor memory such as a DRAM and functions as the work area of the control unit 212. The volatile memory 208 also stores setting information regarding the operation of each unit in the camera 100. The volatile memory 208 further stores status information of the tablet 101 received in a communication control unit 213. The CODEC 209 reproduces the video data stored in the volatile memory 208 and the storage medium 203. The reproduced video data is displayed on the monitor 104 connected to an LCD panel 211 and an external output terminal 216 to be described later. Based on display data such as a GUI generated by the control unit 212 in accordance with a program, an output I/F 210 outputs a display signal to be displayed on the LCD panel 211 and the monitor 104.

The control unit 212 controls the respective units of the video camera 100 by reading out programs stored in the nonvolatile memory 207, loading them to the volatile memory 208, and executing them. Further, the control unit 212 operates as a display control unit by performing setting change processing to be described later. Via a wireless module 214, the communication control unit 213 receives, from the tablet 101, a change request (also simply referred to as a setting change request) for setting information regarding shooting by the video camera 100 and transmits a response signal to the setting change request. The communication control unit 213 also transmits, to the tablet 101, data on captured video or the Web application stored in the nonvolatile memory 207. An antenna 215 transmits/receives a wireless signal conforming to a predetermined communication system. The response signal is transmitted to the tablet 101 in such a way that packet data generated by the control unit 212 and the communication control unit 213 is converted into a modulated signal in a carrier frequency range by the wireless module 214 and transmitted, as a wireless signal, from the antenna 215 to the tablet 101. The external output terminal 216 is a terminal which outputs the video data generated in the image sensor 201 and the camera signal processing unit 202 to an external apparatus in a form conforming to an SDI or HDMI® standard. An example in which the SDI is used will be described in this embodiment. However, the present invention is not limited to the SDI. For example, analog composite output may be used.

Figure 3:
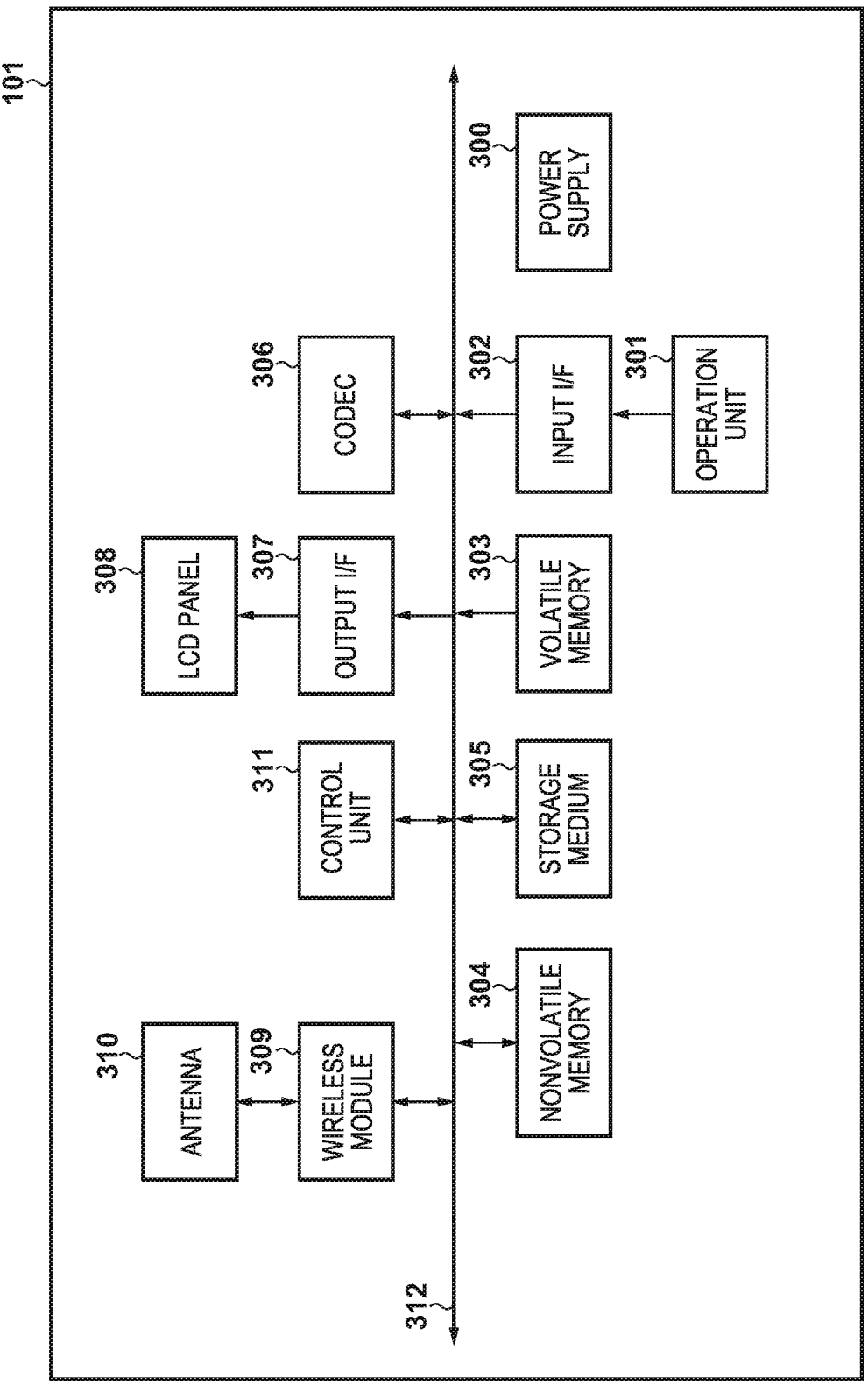
FIG. 3 is a block diagram showing an example of the functional arrangement of a tablet terminal as an example of a communication apparatus according to this embodiment.

FIG. 3 is a block diagram showing an example of the functional arrangement of the tablet 101 according to this embodiment. The respective units of the tablet 101 input/output data via a data bus 312. A power supply 300 is an AC power supply or a battery and supplies power needed for the respective units of the tablet 101. An operation unit 301 includes a touch panel integrally formed with an LCD panel 308 as an input device which accepts a user operation. The touch panel is the input device on which coordinate information corresponding to a position touched with respect to an input unit formed planarly is output, and can be used to instruct the activation or operation of an application operating on the tablet 101. The touch panel may also be a device capable of obtaining a contact strength (pressing force). The operation unit 301 also includes a switch for controlling the tablet 101 to start and stop power supply from the power supply 300. The user operation accepted by the operation unit 301 is input to a control unit 311 via an input I/F 302 and the data bus 312.

A nonvolatile memory 304 includes, for example, a semiconductor memory such as an EEPROM and stores a program for activating the tablet 101. This program is read out to a volatile memory 303 by the control unit 311 when the operation unit 301 supplies an electrical signal from the power supply 300. The volatile memory 303 includes, for example, a semiconductor memory such as a DRAM and also functions as the work area of the control unit 311. Note that an external storage device such as a hard disk device may be utilized instead of the nonvolatile memory 304 or to compensate for the area of the volatile memory 303. A storage medium 305 stores data received from the external apparatus and program data of some of applications executed by the control unit 311. At least one of the nonvolatile memory 304 and the storage medium 305 stores a Web browser program. The control unit 311 can execute a Web application received from a wireless module 309.

A CODEC 306 reproduces the data stored in the volatile memory 303 and storage medium 305, and the reproduced data is displayed on the LCD panel 308 to be described later. Based on display data of a GUI or the like generated by causing the control unit 311 to execute a program, an output I/F 307 outputs a display signal to be displayed on the LCD panel 308. The LCD panel 308 displays information based on the display signal received via the output I/F 307. An antenna 310 transmits/receives a wireless signal conforming to a predetermined communication system. In this embodiment, the tablet 101 operates as an HTTP client and performs wireless communication with the video camera 100 operating as an HTTP server. The signal received by the antenna 310 undergoes demodulation and conversion into packet data by the wireless module 309, and is input to the control unit 311 via the buffer area of the volatile memory 303. A response signal transmitted to the video camera 100 upon completion of the reception is converted into packet data via the control unit 311 and transmitted, by the wireless module 309, to the video camera 100 as a modulated signal in a carrier frequency range.

The control unit 311 loads programs from the nonvolatile memory 304, the storage medium 305, or the wireless module 309 to the volatile memory 303 and executes them. Further, the control unit 311 has a timer function for adjusting the operation timing of each program.

(Series of Operations Related to Setting Change Processing in Tablet 101)

A series of operations related to setting change processing in the tablet 101 will now be described with reference to FIGS. 4A, 4B-1 and 4B-2. Note that this processing is started from a state in which, for example, the user presses the power button of the operation unit 301 to activate the tablet 101. This processing is implemented by causing the control unit 311 to load, to the volatile memory 303, the programs stored in the nonvolatile memory 304 or the storage medium 305, or the programs obtained via the wireless module 309 and to execute them.

Figure 4A:
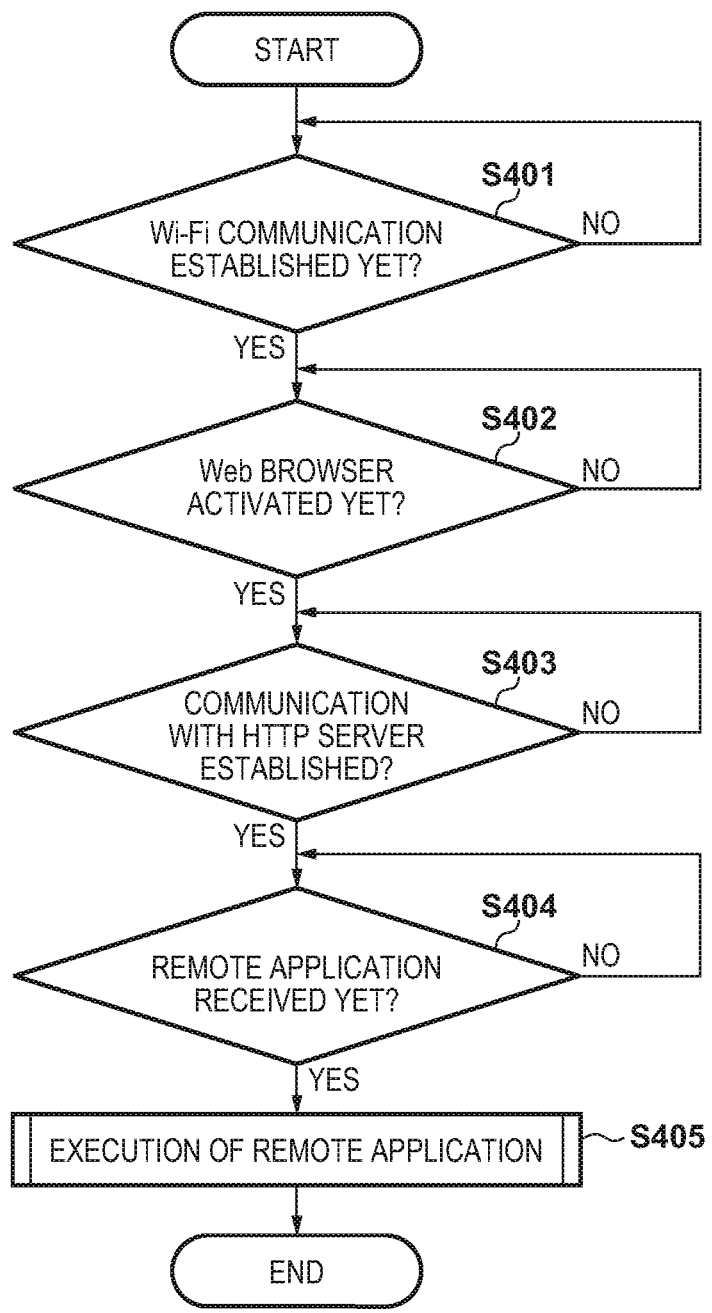

FIG. 4A shows a series of operations until the tablet 101 establishes communication with the video camera 100 and executes a remote application.

In step S401, the control unit 311 determines whether Wi-Fi communication with the video camera 100 has been established via the wireless module 309 and the antenna 310. For example, if the control unit 311 receives a signal indicating connection establishment from the wireless module 309, it determines that the Wi-Fi communication is established and advances the process to step S402. On the other hand, for example, if the control unit 311 does not receive the signal indicating the connection establishment within a predetermined time, it determines that the Wi-Fi connection has not been established and returns the process to step S401.

In step S402, the control unit 311 determines whether the Web browser has been activated yet. For example, if accepting a user operation of activating the Web browser via the operation unit 301 and starting to execute the Web browser, the control unit 311 determines that the Web browser has already been activated and advances the process to step S403. On the other hand, if the Web browser has not been activated, the control unit 311 returns the process to step S402 again.

In step S403, the control unit 311 determines whether communication with the HTTP server operating as the video camera 100 has been established. For example, if establishing an SSL session in order to communicate safely between the HTTP server and the Web browser activated in step S402, and completing the establishment of the session, the control unit 311 determines that the communication with the HTTP server has been established. On the other hand, if the communication with the HTTP server has not been established, the control unit 311 returns the process to step S403. Note that a process of establishing the session described above is an example, and the control unit 311 may determine that the condition of this step is met (Yes) if just becoming communicable with the HTTP server (for example, generation of a socket is completed).

In step S404, the control unit 311 determines whether a remote application program has been received yet. For example, the control unit 311 downloads the remote application program by the communication established with the HTTP server in step S403. If the download of the program is completed, the control unit 311 determines that the remote application program has already been received and advances the process to step S405.

In step S405, the control unit 311 executes the remote application downloaded in step S404 on the Web browser, and then terminates the series of operations related to this processing.

Figures 1, 4B:
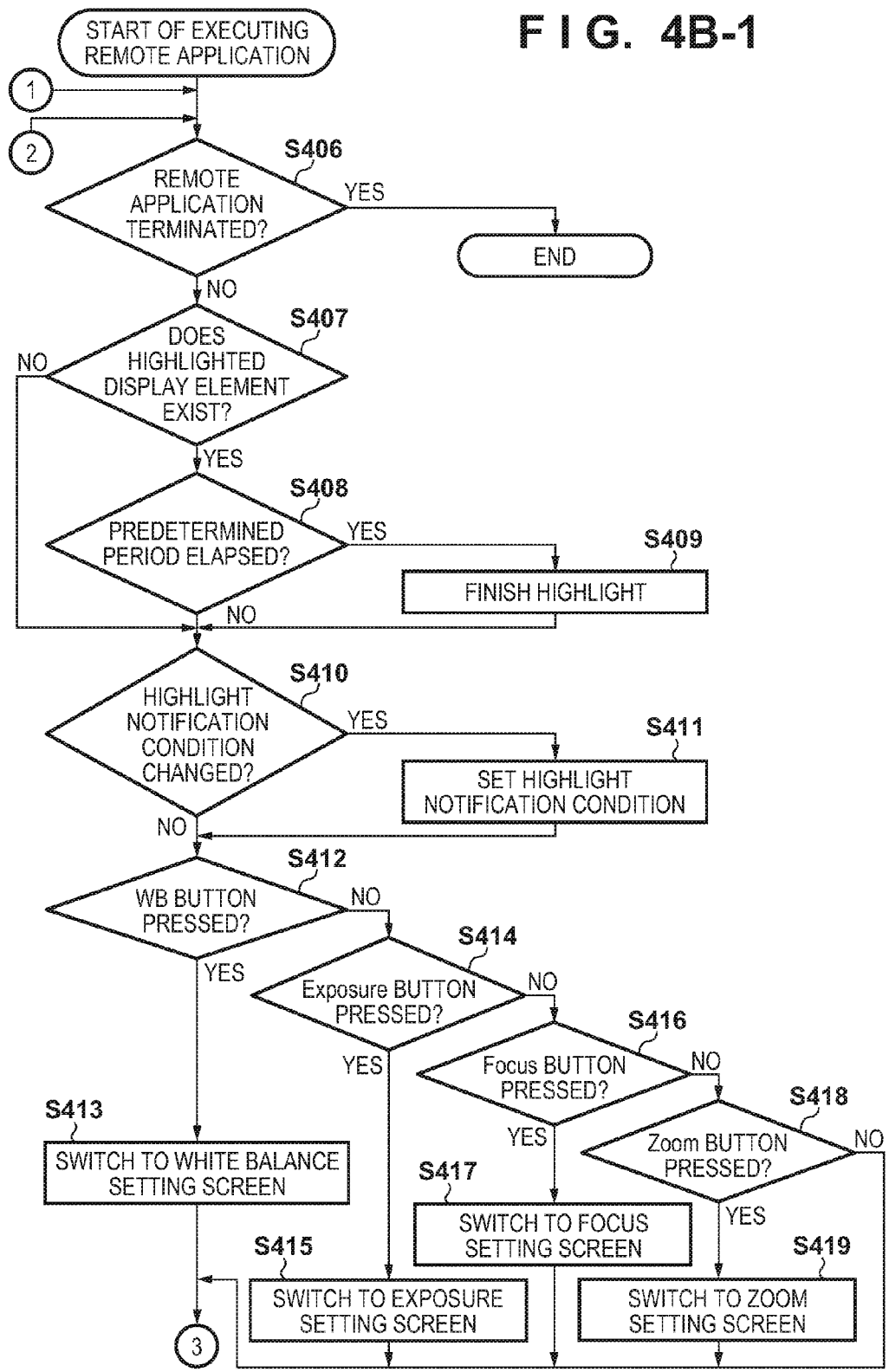
Figures 2, 4B:
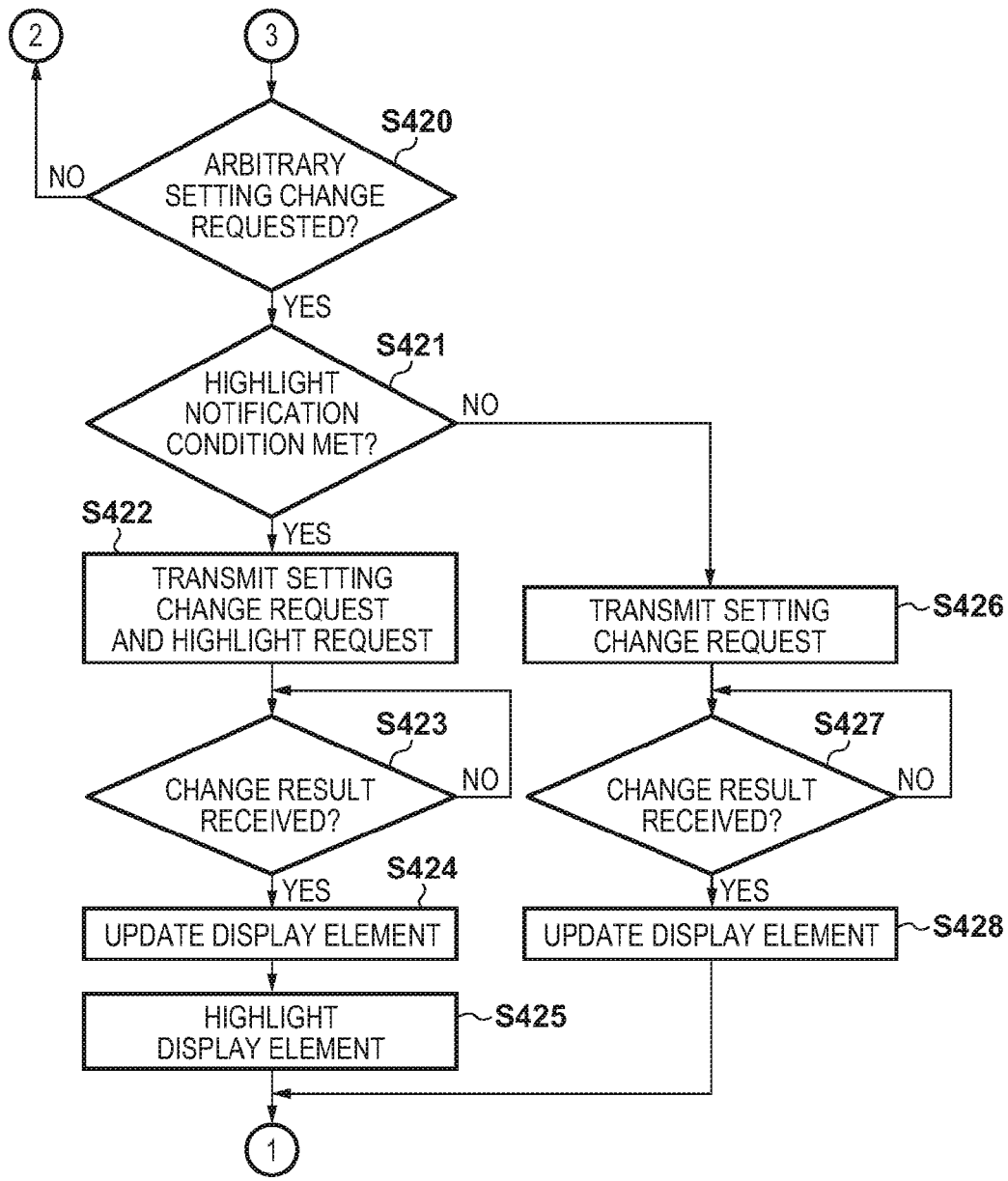
Figure 5A:
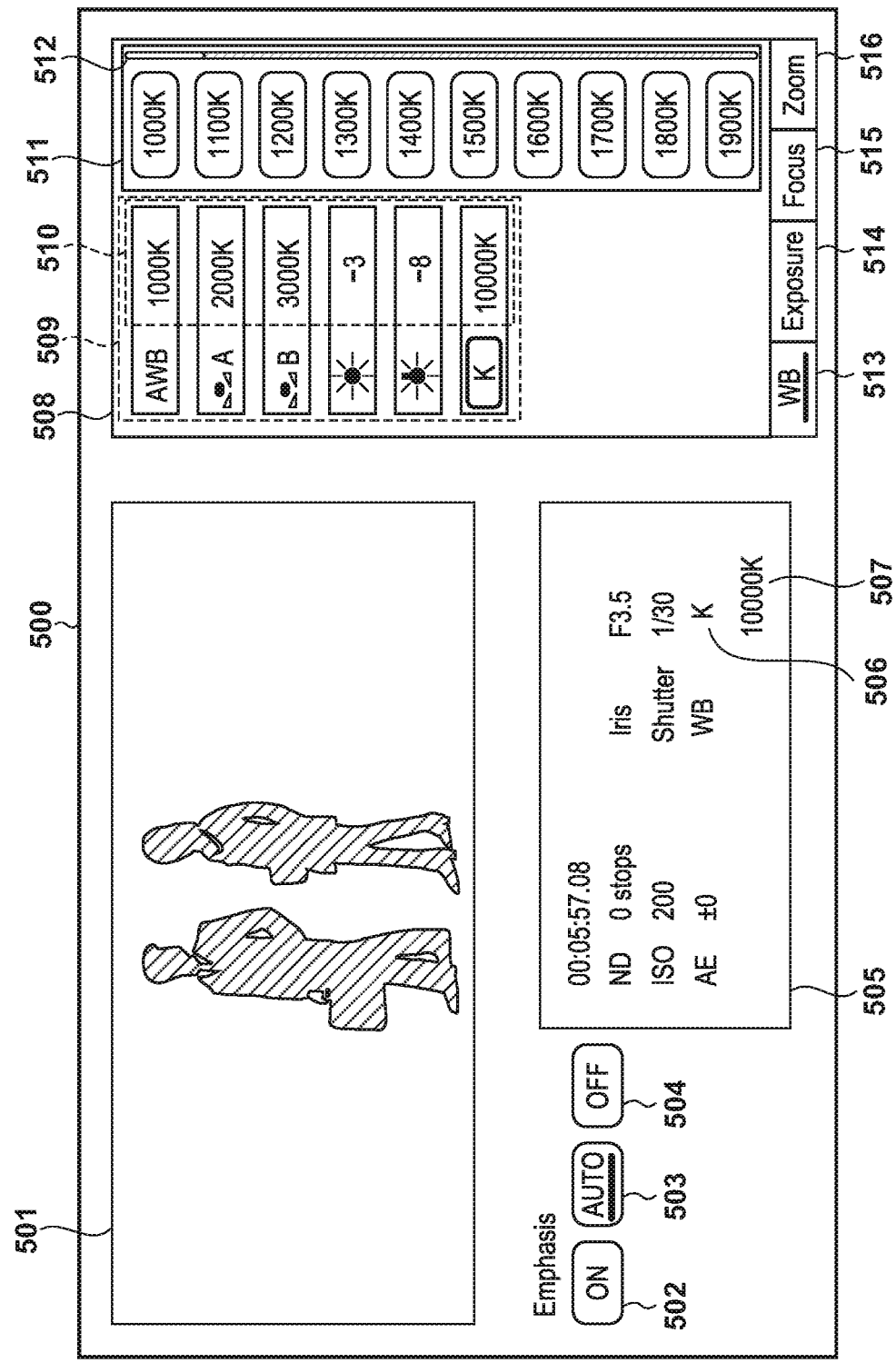
FIGS. 5A to 5C are views schematically showing examples of respective screen displays in the tablet terminal and the video camera according to the first embodiment.

A series of operations related to the execution of the remote application implemented by the control unit 311 in step S405 will now be described with reference to FIGS. 4B-1 and 4B-2. Upon executing the remote application, the control unit 311 displays a GUI screen on the entire LCD panel 308. Note that FIG. 5A shows an example of the screen arrangement of the remote application displayed on the LCD panel 308. A screen 500 represents the entire GUI screen generated by the control unit 311. An area 501 is a live view area for displaying camera-through video received from the video camera 100. Other display elements shown in FIG. 5A will be described later as needed together with a description of the series of operations to be described with reference to FIGS. 4B-1 and 4B-2.

In step S406, the control unit 311 determines whether the remote application is terminated. For example, if accepting an operation of terminating an application (not shown) via the operation unit 301, the control unit 311 determines that the remote application is terminated and terminates this series of operations. Otherwise, the control unit 311 determines that the remote application is not terminated and advances the process to step S407.

In step S407, the control unit 311 determines whether a highlighted display element exists. The control unit 311 determines the presence/absence of a timer set in step S425 to be described later and indicating that a specific display element is highlighted. If a timer measuring time exists, the control unit 311 determines that the highlighted display element exists and advances the process to step S408. If the timer measuring time does not exist, the control unit 311 determines that the highlighted display element does not exist and advances the process to step S410.

In step S408, the control unit 311 determines whether a state in which the display element is highlighted has continued for a predetermined period. For example, if the above-described timer indicating that the specific display element is highlighted measures a predetermined period or more, the control unit 311 determines that the state in which the display element is highlighted has continued for the predetermined period and advances the process to step S409. If the timer does not measure the predetermined period or more, the control unit 311 determines that the state in which the display element is highlighted has not continued for the predetermined period and advances the process to step S410.

In step S409, the control unit 311 finishes highlighting the display element determined in step S408.

In step S410, the control unit 311 determines whether a change is made in the setting of a condition (also simply referred to as a highlight notification condition) on which information to be highlighted (also simply referred to as a highlight notification) is transmitted to the video camera 100. Note that the control unit 311 sets this highlight notification condition based on user operations with respect to buttons 502 to 504. The buttons 502 to 504 shown in FIG. 5A indicate that one of them is operative by displaying the button in a mode different from that of the others. The button 502 sets the highlight notification condition so as to always transmit the highlight notification. When the button 502 is operative, the highlight notification is issued always (without asking for a judgment each time) every time the user transmits the setting change request to the video camera 100.

When the button 503 is operative, the highlight notification condition is set so as to transmit the highlight notification if predetermined conditions are met. The following conditions according to, for example, an operation mode or the values of the display elements on the touch panel can be applied to these predetermined conditions.

Condition case 1: a case in which the touch panel is pressed with a strong force equal to or larger than a predetermined threshold at the time of an operation in step S420 to be described later on the touch panel capable of detecting the contact strength. Applying such a condition allows the user of the tablet 101 to easily switch, with one-stroke operation, whether to make a highlight notification for each display element every time a setting change is made. In other words, the user can select only a change with respect to a display element to be specifically recognized by a photographer (cameraman) and the movie director, and transmit the highlight notification.

Condition case 2: a case in which the touch panel is pressed for a long time (long press) equal to or longer than a predetermined time at the time of the operation in step S420 to be described later. As in condition example 1, applying such a condition also allows the user of the tablet 101 to easily switch, with one-stroke operation, whether to make a highlight notification for each display element every time a setting change is made. In particular, using this condition allows the user to select only a change with respect to a display element to be specifically recognized and transmit the highlight notification even if the touch panel of the tablet 101 cannot detect the contact strength.

Condition case 3: a case in which a setting change exceeding a predetermined range is made by the operation in step S420 to be described later. Note that the predetermined range may be received from the video camera 100 via the wireless module 309 or may be set by the user from the GUI on the LCD panel 308. This makes it possible to notify the movie director and the cameraman operating the video camera 100 of a setting change exceeding a range planned in advance only when the change is made.

The button 504 sets the highlight notification condition so as to always disable the highlight notification. When the button 504 is operative, the highlight notification is not transmitted (without asking for a judgment each time) even if the user transmits the setting change request to the video camera 100.

It is possible, by using the highlight notification condition as described above, to transmit a highlight notification only about changed contents useful for the assistant, the cameraman, or the movie director involving shooting when the setting change request is transmitted to the video camera 100. Accordingly, only a change that influences the duty of the cameraman or the like is highlighted in the video camera 100, allowing the cameraman or the like to concentrate on his own duty.

Note that setting changes with respect to the buttons 502 to 504 may be made by a method other than pressing of the buttons on the touch panel. For example, the changes may be accepted by a physical switch included in the operation unit 301. In this case, the same effect as the touch panel is obtained. Alternatively, the changes may be received from the video camera 100 via the wireless module 309. In this case, the movie director or the cameraman operating the video camera 100 can change the highlight notification condition, allowing him to set, in the tablet 101, a condition on which he himself wants to receive a highlight notification.

The control unit 311 determines whether the setting of the highlight notification condition is changed and advances the process to step S411 if it determines that the setting is changed. On the other hand, if the control unit 311 determines that the setting is not changed, it advances the process to step S412.

In step S411, the control unit 311 changes the highlight notification condition held in the volatile memory 303 to the setting changed in step S410. In step S412, the control unit 311 determines, based on an input from the operation unit 301, whether a WB (white balance) button 513 for switching a setting change area 508 is pressed. If the control unit 311 determines that the WB button 513 is pressed, it advances the process to step S413. If the control unit 311 determines that the WB button 513 is not pressed, it advances the process to step S414.

In step S413, the control unit 311 changes the setting change area 508 included in the screen 500 to a screen arrangement for a white balance setting. Note that a white balance setting screen is shown in an example of the setting change area 508 shown in FIG. 5A. On setting screens in other functions to be described later, however, the setting change area 508 has display arrangements corresponding to the respective functions. Note that buttons for setting the respective functions can be displayed on the setting screens in the other functions, and thus a detailed description of the setting screens in the other functions will be omitted.

In step S414, the control unit 311 determines, based on an input from the operation unit 301, whether an Exposure button 514 is pressed. If the control unit 311 determines that the Exposure button 514 is pressed, it advances the process to step S415. If the control unit 311 determines that the Exposure button 514 is not pressed, it advances the process to step S416. In step S415, the control unit 311 changes the setting change area 508 included in the screen 500 to a screen arrangement for an exposure setting.

In step S416, the control unit 311 determines, based on an input from the operation unit 301, whether a Focus button 515 is pressed. If the control unit 311 determines that the Focus button 515 is pressed, it advances the process to step S417. If the control unit 311 determines that the Focus button 515 is not pressed, it advances the process to step S418. In step S417, the control unit 311 changes the setting change area 508 included in the screen 500 to a screen arrangement for a focus setting.

In step S418, the control unit 311 determines, based on an input from the operation unit 301, whether a Zoom button 516 is pressed. If the control unit 311 determines that the Zoom button 516 is pressed, it advances the process to step S419. If the control unit 311 determines that the Zoom button 516 is not pressed, it advances the process to step S420. In step S419, the control unit 311 changes the setting change area 508 included in the screen 500 to a screen arrangement for a zoom setting.

In step S420, the control unit 311 determines whether a setting change request with respect to an arbitrary display element is made in the setting change area 508. In an example of the white balance setting screen shown in FIG. 5A, the user can request any of buttons included in an area 509 or an area 511 for a change in the white balance setting. For example, a button group requesting a change in white balance mode is arranged in the area 509. For example, the buttons corresponding to Auto, white balance data take-in operation A, white balance data take-in operation B, sunlight, tungsten light, and a Kelvin manual setting are arranged in order from the top. In the example shown in FIG. 5A, it is indicated that the Kelvin manual setting is enabled by displaying a frame which surrounds an icon in a button area. In addition, operation parameters when switched to the respective white balance modes are displayed in an area 510 in the area 509. A button group for selecting respective values that can be set in a current white balance mode is arranged in the area 511. A scroll bar 512 indicates that other buttons can be displayed by scrolling when buttons in the area 511 fall outside the screen. When any of the buttons in the area 509 or any of the buttons in the area 511 is touched, the control unit 311 determines that the setting change request with respect to the arbitrary display element is made and advances process to the step S421. Otherwise, the control unit 311 determines that the setting change request is not made and returns the process to step S406.

In step S421, the control unit 311 determines whether the contents of the setting change request in step S420 meet the highlight notification condition set in step S411. For example, when the button 502 is operative, the control unit 311 determines that the contents of the setting change request in step S420 meet the highlight notification condition. When the button 503 is operative, the control unit 311 determines whether the highlight notification condition is met by further determining, for example, whether the contents of the setting change request in step S420 are the operation of pressing the touch panel with the strong force equal to or larger than the predetermined threshold. Alternatively, the control unit 311 determines whether the highlight notification condition is met by further determining whether the contents of the setting change request in step S420 exceed the predetermined range. On the other hand, when the button 504 is operative, the control unit 311 determines that the contents of the setting change request in step S420 do not meet the highlight notification condition. If the control unit 311 determines that the contents of the setting change request meet the highlight notification condition, it advances the process to step S422. If the control unit 311 determines that the contents do not meet the highlight notification condition, it advances the process to step S426.

In step S422, the control unit 311 transmits a setting change request and a highlight notification to the video camera 100 such that a display element related to the setting change request is highlighted in the video camera 100. Based on the transmitted setting change request and the highlight notification, the video camera 100 changes a setting in the video camera 100 and highlights a display element related to the setting. Furthermore, the video camera 100 transmits a setting change result on the item of the setting to the tablet 101.

In step S423, the control unit 311 determines whether the setting change result is received from the video camera 100. For example, if the control unit 311 determines, based on an input from the wireless module 309, that the setting change result is received, it advances the process to step S424. On the other hand, if the control unit 311 determines that the setting change result is not received, it returns the process to step S423 and waits for the reception of the setting change result. In step S424, the control unit 311 updates a display element corresponding to the setting change result received in step S423 out of display elements displayed in a state display area 505. For example, if the buttons of the area 509 are operated in step S420, the control unit 311 receives a setting change result related to the white balance mode and its adjustment state from the video camera 100 in step S423, and updates display elements 506 and 507 corresponding to the setting change result. Alternatively, if the buttons of the area 511 are operated in step S420, the control unit 311 updates only the display element 507. In this example, the control unit 311 further updates the display of the buttons in the area 509 so as to match the white balance mode and an adjustment value after the setting change.

In step S425, the control unit 311 highlights the display element updated in step S424. For example, one of the following (1) to (4) or a combination of these is used for the highlight according to this embodiment. The control unit 311 (1) sets a display color to a color different from those of the other display elements, (2) makes a character size larger than those of the other display elements, (3) makes a font or an effect different from those of the other display elements, (4) flickers the display elements, or (5) displays a dialogue which provides a setting change notification. Note that another expression other than those described above may be used as long as the updated display element is seen highlighted. At this time, the control unit 311 starts a timer indicating that, for example, a specific display element is highlighted for determining the presence/absence of the highlighted display element and its elapsed time in steps S407 and S408. Note that a display change in step S425 may be made concurrently with a display change in step S424.

In step S426, the control unit 311 transmits only a setting change request to the video camera 100 such that a display element related to the setting change request in step S420 is not highlighted in the video camera 100. The video camera 100 changes a setting in the video camera 100 based on the received setting change request. Moreover, the video camera 100 transmits a setting change result on a setting item to the tablet 101.

In step S427, the control unit 311 determines whether the setting change result is received from the video camera 100. If the control unit 311 determines, based on a notification from the wireless module 309, that the setting change result is received from the video camera 100, it advances the process to step S428. If the control unit 311 determines that the result is not received, it returns the process to step S427.

As in step S424, the control unit 311 updates a display element corresponding to the setting change result received in step S427 out of the display elements displayed in the state display area 505 in step S428. The control unit 311 also updates the buttons in the area 509 so as to match the white balance mode and an adjustment value after the setting change. Subsequently, the control unit 311 returns the process to step S406 again and terminates the series of operations related to this processing when the remote application is terminated in accordance with a determination in step S406.

(Series of Operations Related to Setting Change Processing in Video Camera 100)

Figure 4C:
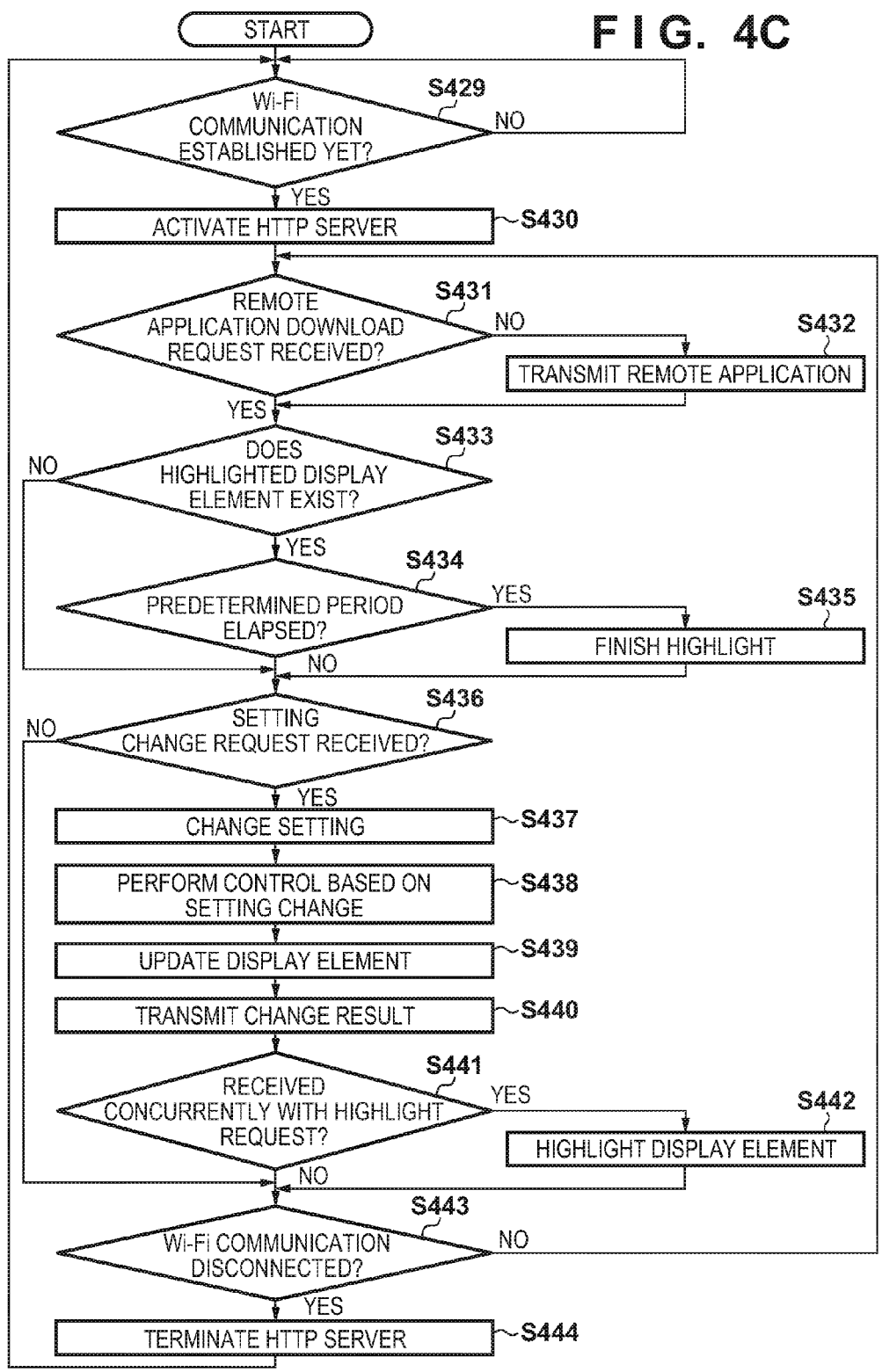
FIG. 4C is a flowchart showing a series of operations of setting change processing in a video camera according to the first embodiment.
Figure 5B:
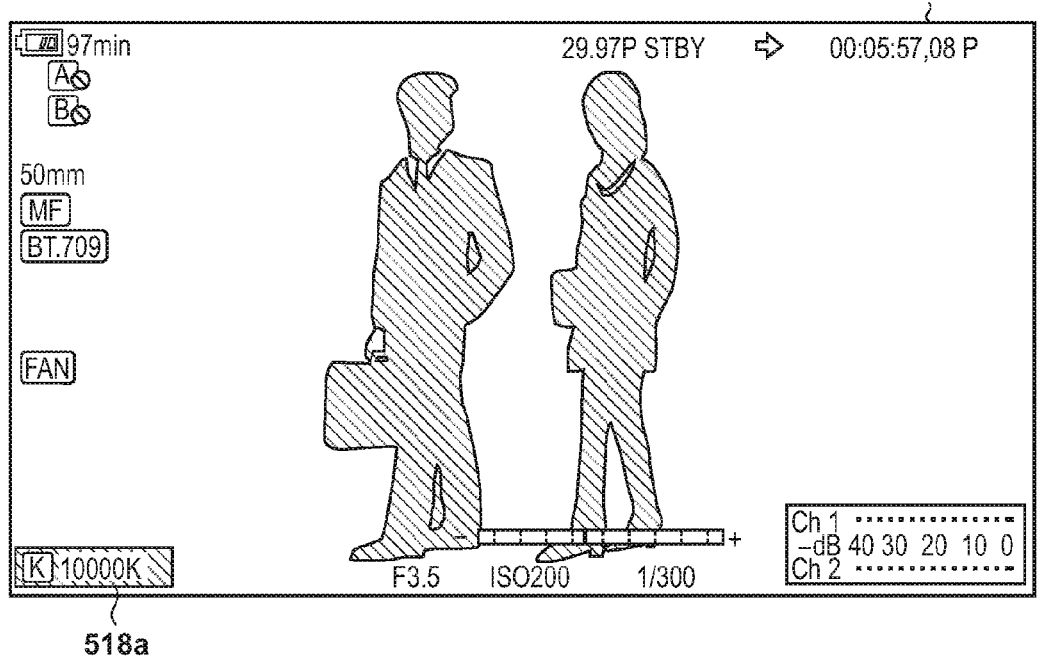
Figure 5C:
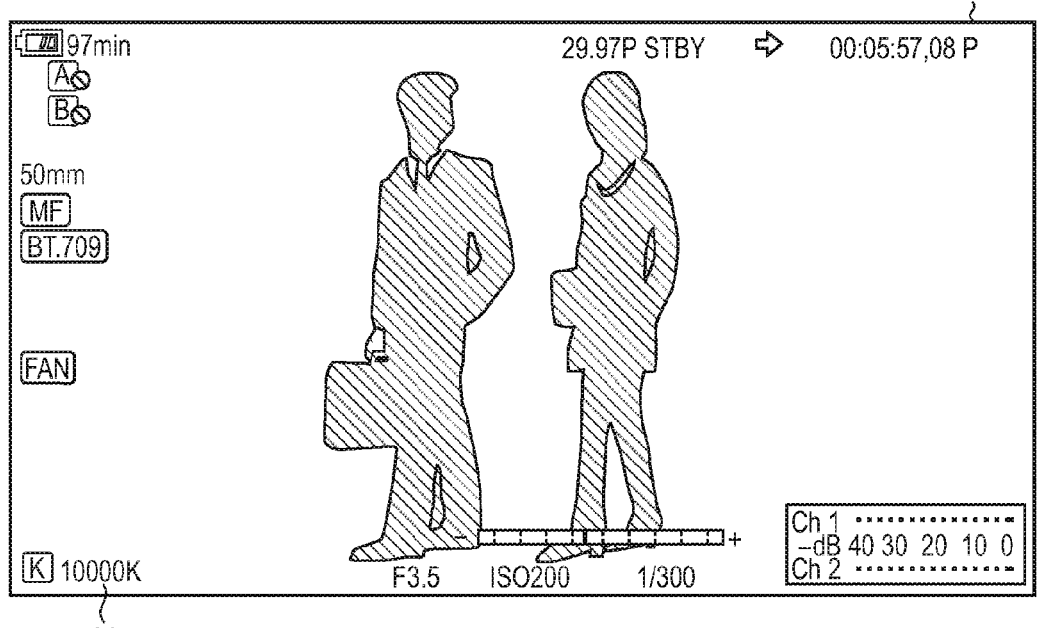

The operation of the video camera 100 implemented by the control unit 212 will now be described with reference to FIG. 4C. This operation is related to communication with the tablet 101 in which the remote application is executed. FIGS. 5B and 5C show an example the arrangement of a live view screen displayed on the LCD panel 211 or a live view screen displayed on the monitor 104 connected to the external output terminal 216. FIG. 5B shows a state in which a display element regarding a setting changed by the remote application is highlighted. FIG. 5C shows a state in which none of the display elements is highlighted. Other display elements shown in FIGS. 5B and 5C will be described later as needed together with a description of the series of operations to be described with reference to FIG. 4C.

In step S429, the control unit 212 inquires of the communication control unit 213 whether Wi-Fi communication has been established with the tablet 101 via the wireless module 214 and the antenna 215. If connection by the Wi-Fi communication has been established in the communication control unit 213, the process advances to step S430. On the other hand, if the connection by the Wi-Fi communication has not been established within a predetermined time, the process returns to step S429.

In step S430, the control unit 212 controls the communication control unit 213 to activate the HTTP server. In step S431, the control unit 212 determines whether the communication control unit 213 receives a remote application download request from the tablet 101 by HTTP communication. If the communication control unit 213 receives the download request, the control unit 212 controls the communication control unit 213 to read out the remote application from the nonvolatile memory 207 or the storage medium 203 and transmit it to the tablet 101 in step S432. If the communication control unit 213 does not receive the download request, the process advances to step S433.

In step S433, the control unit 212 determines whether a highlighted display element exists. The control unit 212 determines the presence/absence of a timer set in step S442 to be described later and indicating that a specific display element is highlighted. If a timer measuring time exists, the control unit 212 determines that the highlighted display element exists and advances the process to step S434. If the timer measuring time does not exist, the control unit 212 determines that the highlighted display element does not exist and advances the process to step S436.

In step S434, the control unit 212 determines whether a state in which the display element is highlighted has continued for a predetermined period. For example, if the above-described timer indicating that the specific display element is highlighted measures a predetermined period or more, the control unit 212 determines that the state in which the display element is highlighted has continued for the predetermined period and advances the process to step S435. If the timer does not measure the predetermined period or more, the control unit 212 determines that the state in which the display element is highlighted has not continued for the predetermined period and advances the process to step S436. In step S435, the control unit 212 finishes highlighting the display element determined in step S433.

In step S436, the control unit 212 determines whether the communication control unit 213 receives a setting change request from the tablet 101 by the HTTP communication. If the communication control unit 213 receives the setting change request, the process advances to step S437. If the communication control unit 213 does not receive the setting change request, the process advances to step S443.

In step S437, the control unit 212 changes, based on the setting change request received in step S436, setting information stored in the volatile memory 208. In step S438, the control unit 212 performs control on the respective units of the video camera 100 based on setting contents changed in step S437. For example, if the setting changed in step S437 is related to white balance, the camera signal processing unit 202 is controlled based on the contents. Alternatively, if the setting changed in step S437 is related to an aperture, a focus, or a zoom, the imaging optical system 200 is controlled based on the contents.

In step S439, the control unit 212 updates a display element related to the result of the control performed in step S438 out of display elements displayed in a live view screen 517. For example, if a white balance setting is changed in step S438, the control unit 212 updates a display element 518a or 518b corresponding to the setting change result.

In step S440, the control unit 212 controls the communication control unit 213 to transmit the setting change result in step S438 to the tablet 101. In step S441, the control unit 212 determines whether the communication control unit 213 receives a highlight request concurrently with the setting change request in step S436. If the control unit 212 determines that the communication control unit 213 receives the highlight request, it advances the process to step S442. On the other hand, if the control unit 212 determines that the communication control unit 213 does not receive the highlight request, it advances the process to step S443. At this time, a display element regarding changed white balance is displayed without being highlighted as 518b.

In step S442, the control unit 212 highlights the display element updated in step S439. Any of highlight variations in the tablet 101 or a combination of them is used for highlight according to this embodiment. For example, 518a shown in FIG. 5B is an example thereof, and the display element related to the changed white balance is highlighted by displaying it while superimposing a colored underlying rectangular on it. Note that another expression other than the above may be used as long as the updated display element is seen highlighted. At this time, the control unit 212 starts a timer indicating that, for example, a specific display element is highlighted for determining the presence/absence of the highlighted display element and its elapsed time in steps S433 and S434. Note that a display change in step S442 may be made concurrently with a display change in step S439.

In step S443, the control unit 212 judges whether the Wi-Fi communication with the tablet 101 established in the communication control unit 213 is disconnected. If the connection by the Wi-Fi communication is disconnected, the process advances to step S444. On the other hand, if the Wi-Fi communication is not disconnected, the process returns to step S431. In step S444, the control unit 212 terminates the HTTP server activated by the communication control unit 213.

As described above, in this embodiment, if the contents of the setting change request meet the highlight notification condition, the setting change request and the highlight notification are transmitted to the video camera 100 such that the display element related to the setting change is highlighted in the video camera 100. If the contents of the setting change request do not meet the highlight notification condition, only the setting change request is transmitted to the video camera 100 without transmitting the highlight notification. This makes it possible to highlight only a change that influences the duty of the cameraman on the side of the video camera 100 and allows the cameraman to concentrate on his own duty. In other words, it becomes possible to notify the user of the image capturing apparatus of only the desired setting item out of the changed setting items when the setting of the video camera 100 is changed from the tablet 101.

Furthermore, the tablet 101 receives the setting change result in the video camera 100 and highlights the display element in the video camera 100 in accordance with the reception of the setting change result. This allows the user of the tablet 101 receiving the setting change request to confirm in the tablet 101 that highlight in the video camera 100 is performed as intended.

Note that in the above-described embodiment, the description has been made assuming that each display element included in the state display area 505 is not targeted for the setting change request. However, when the respective display elements included in the state display area 505 are regarded as buttons, and these display elements are touched, a setting change request may be transmitted based on a highlight notification condition, and display elements of the video camera 100 corresponding to the touched display elements may be highlighted. This makes it possible to implement highlight in the LCD panel 211 or the monitor 104 not only when the setting is changed but also when just the course of the state of the video camera 100 is to be recognized by the cameraman, the movie director, or the assistant.

Second Embodiment

The second embodiment will now be described. In the second embodiment, a tablet 101 transmits, to a video camera 100, a condition (highlight condition) for performing highlight in the video camera 100 in advance. Then, a display element highlighted in the video camera 100 is highlighted in the tablet 101. Therefore, the arrangements of the video camera 100 and the tablet 101 of this embodiment are the same as in the first embodiment, and only a part of setting change processing and a part of a display screen are different. Accordingly, the same reference numerals as in the first embodiment denote the same arrangement, steps, and display elements, the repetitive description will be omitted, and a difference will mainly be described.

(Series of Operations Related to Setting Change Processing in Tablet 101)

A series of operations related to setting change processing in this embodiment will be described with reference to FIGS. 6A-1, 6A-2 and 7. As in the first embodiment, this series of operations is implemented by causing a control unit 311 to load, to a volatile memory 303, programs stored in a nonvolatile memory 304 or a storage medium 305, or programs obtained via a wireless module 309 and execute them.

First, the control unit 311 performs operations (steps S401 to S405) from establishment of communication with the video camera 100 to execution of a remote application as in the first embodiment, and performs the process in steps S406 to S409 and advances the process to step S601.

Figure 7:
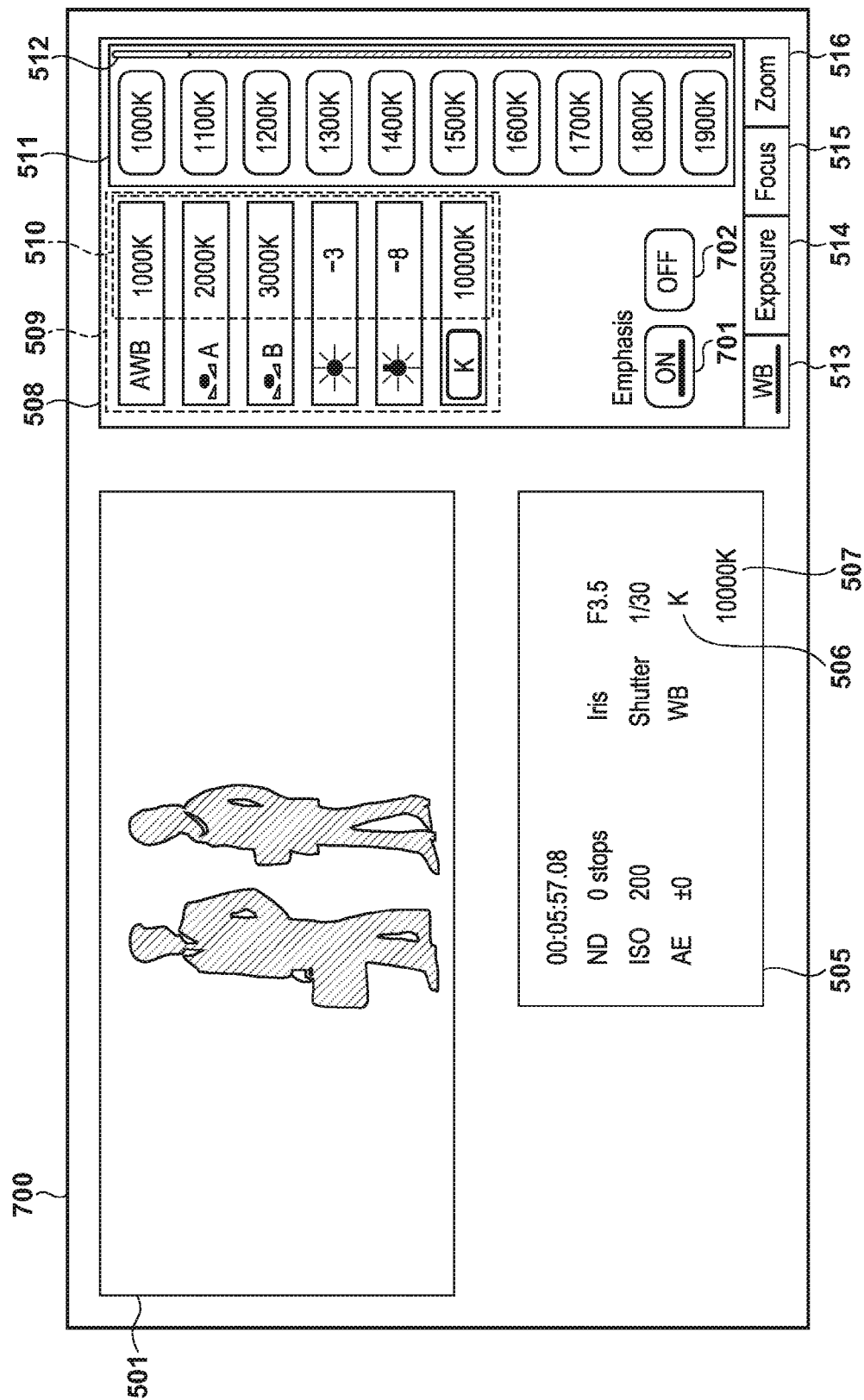
FIG. 7 is a view schematically showing an example of a screen display in the tablet terminal according to the second embodiment.

FIG. 7 shows an example of the screen arrangement of a remote application displayed on an LCD panel 308 in this embodiment. A screen 700 represents an entire GUI screen generated by an output I/F 307. On the screen 700 in FIG. 7, the buttons 502 to 504 for setting the highlight notification conditions present in the first embodiment do not exist, but buttons 701 and 702 exist.

In step S601, the control unit 311 determines whether a highlight condition transmitted to the video camera 100 is changed. This highlight condition is changed based on a user operation for the button 701 or the button 702. One of the button 701 and the button 702 is displayed in a mode different from that of the other, indicating that a state corresponding to that button is enabled. The button 701 enables the highlight of a function (that is, a white balance function) corresponding to a setting change area 508 currently being displayed. The button 702 disables the highlight of the function corresponding to the setting change area 508 currently being displayed. For example, if an immediately preceding highlight condition and a newly input highlight condition are different from each other, the control unit 311 determines that the highlight condition is changed and advances the process to step S602. On the other hand, if the control unit 311 determines that the highlight condition is not changed, it advances the process to step S412.

Note that instead of the button 701 and the button 702, for example, a button for designating the lower limit and the upper limit of values that can be set by buttons in an area 511 may be provided. A highlight condition in this case is setting an outside range of the values designated by these two buttons.

In step S602, the control unit 311 transmits, to the video camera 100, the highlight condition corresponding to the button pressed in step S601. Subsequently, if the control unit 311 determines that a setting change is requested by further performing the process in steps S412 to S420 as in the first embodiment, it transmits a setting change request to the video camera 100 as in step S426.

In step S603, the control unit 311 determines whether a setting change result and a highlight result in the video camera 100 are received from the video camera 100. Note that the highlight result is information indicating whether the video camera 100 highlights a display element based on the highlight display condition. If the control unit 311 determines, based on an input from the wireless module 309, that the setting change result and the highlight result are received from the video camera 100, it advances the process to step S424. On the other hand, if the control unit 311 determines that they are not received, it returns the process to step S603 again.

In step S604, the control unit 311 determines whether the highlight result received in step S603 indicates that highlight is performed in the video camera 100. If the control unit 311 determines that the highlight result indicates that highlight is performed in the video camera 100, it advances the process to step S425. On the other hand, if the control unit 311 determines that the highlight result indicates that highlight is not performed, it returns the process to step S406 without performing highlight.

(Series of Operations Related to Setting Change Processing in Video Camera 100)

Figures 1, 6A:
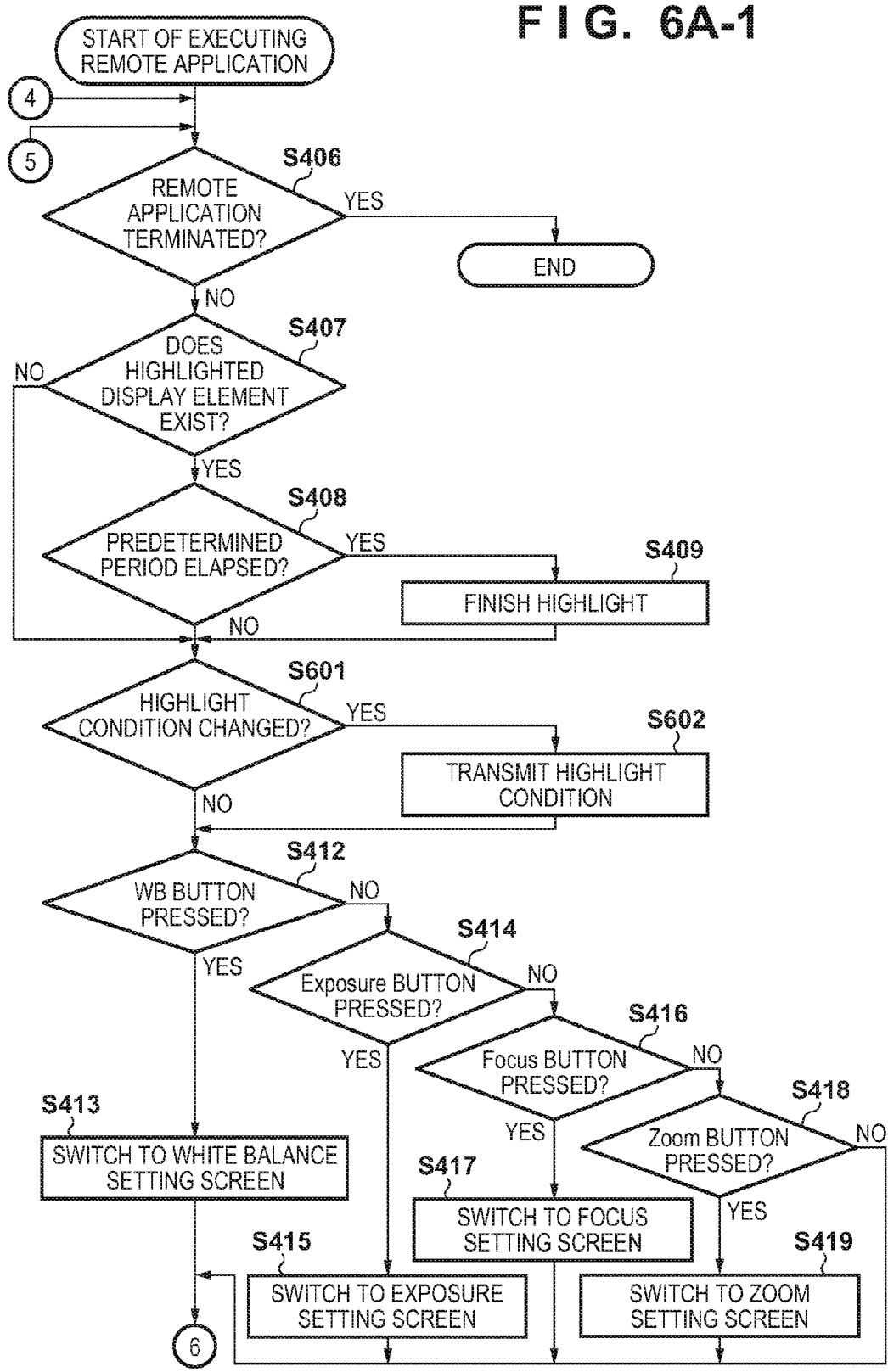
Figures 2, 6A:
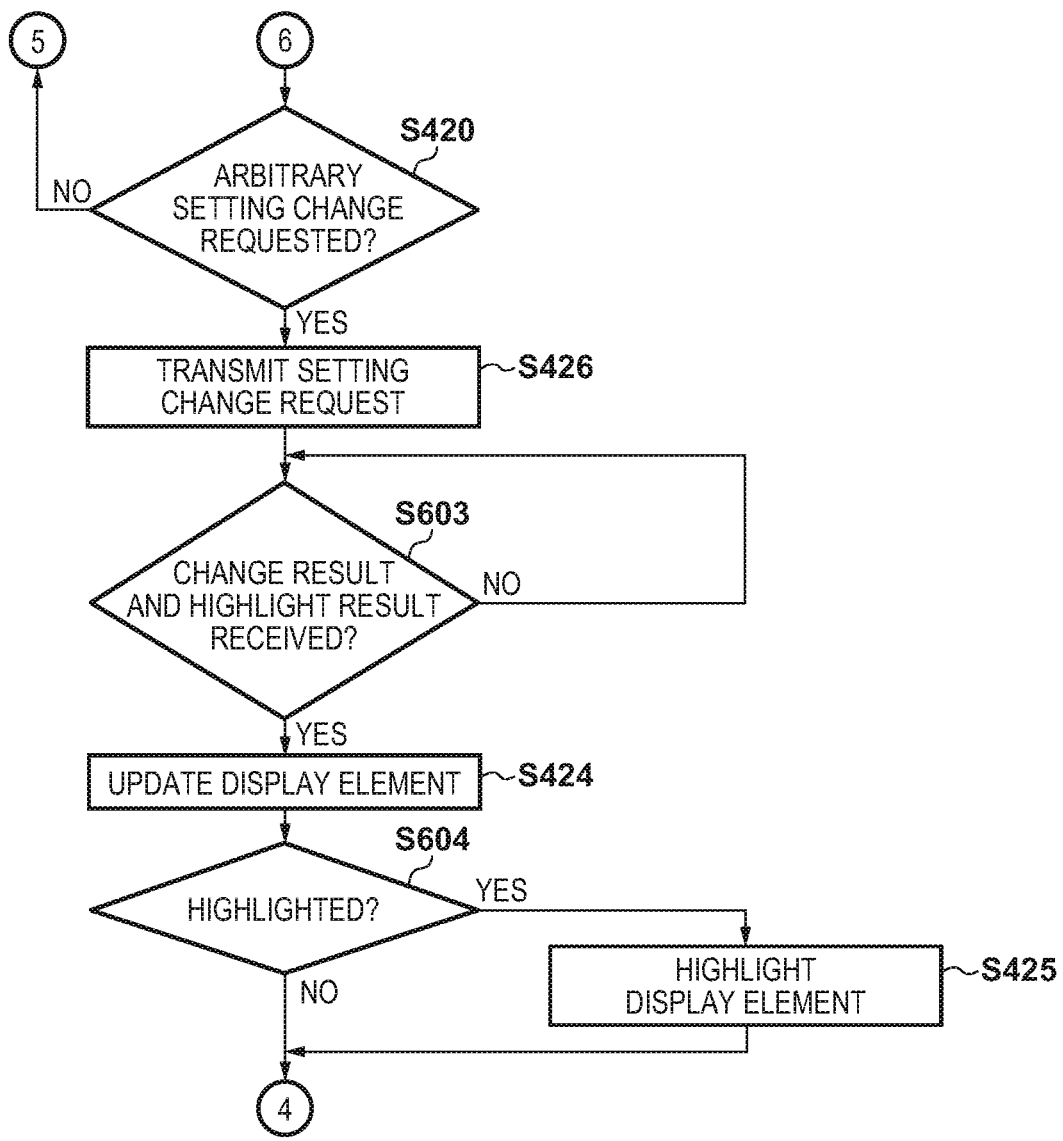
Figures 1, 6B:
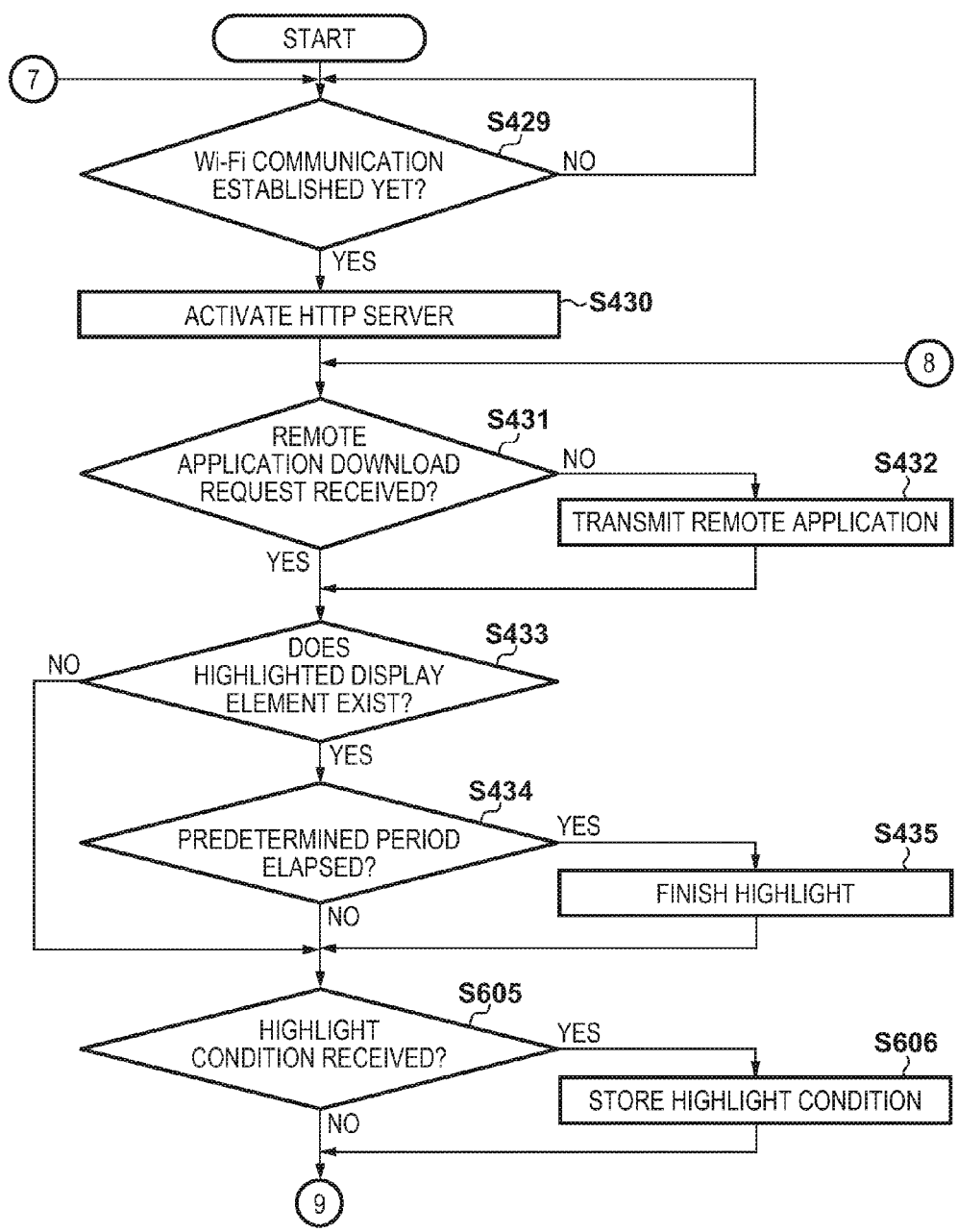
Figures 2, 6B:
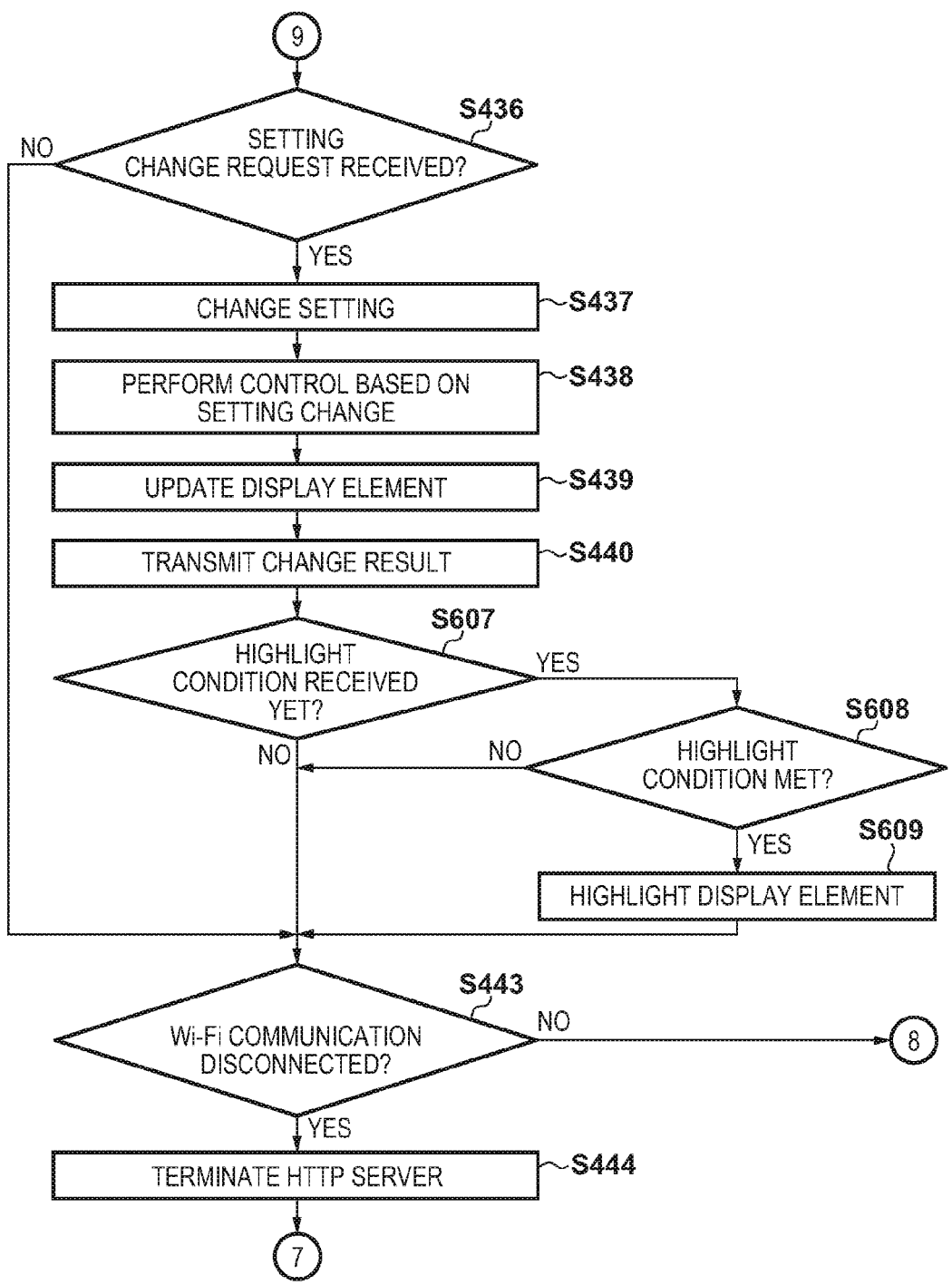

The operation of the video camera 100 implemented by a control unit 212 will now be described with reference to FIGS. 6B-1 and 6B-2. This operation is related to communication with the tablet 101 in which a remote application is executed. The arrangements of a live view screen displayed on an LCD panel 211 and a live view screen displayed on a monitor 104 connected to an external output terminal 216 are the same as in FIGS. 5B and 5C.

First, the control unit 212 performs operations (steps S429 and S430) from establishment of communication with the tablet 101 to the activation of an HTTP server as in the first embodiment, and performs the process in steps S431 to S435 and advances the process to step S605. In step S605, the control unit 212 determines whether a communication control unit 213 receives a highlight condition from the tablet 101 by HTTP communication. If the communication control unit 213 receives the highlight condition, the process advances to step S606. If the communication control unit 213 does not receive the highlight condition, the process advances to step S436.

In step S606, the control unit 212 stores the highlight condition received in step S605 in a volatile memory 208. If the highlight condition has already been stored, the control unit 212 updates that value.

Subsequently, if the control unit 212 determines that the communication control unit 213 receives a setting change request by further performing the process in steps S436 to S440 as in the first embodiment, it performs a process following a change.

In step S607, the control unit 212 determines whether the communication control unit 213 has already received the highlight condition in step S605. If the control unit 212 determines that the communication control unit 213 has already received the highlight condition, it advances the process to step S608. On the other hand, if the control unit 212 determines that the communication control unit 213 has not received the highlight condition yet, it advances the process to step S443.

In step S608, the control unit 212 determines whether the setting information changed in step S437 meets the highlight condition stored in step S606. If the control unit 212 determines that the information meets the highlight condition, it advances the process to step S609. On the other hand, if the control unit 212 determines that the information does not meet the highlight condition, it advances the process to step S443. At this time, a display element related to changed white balance is displayed without being highlighted as 518b.

In step S609, the control unit 212 highlights the display element updated in step S439. For example, 518a shown in FIG. 5B is an example thereof, and a display element related to changed white balance is highlighted. Note that another expression other than the above may be used as long as the updated display element is seen highlighted. At this time, the control unit 212 starts a timer indicating that, for example, a specific display element is highlighted for determining the presence/absence of the highlighted display element and its elapsed time in steps S433 and S434. Note that a display change in step S609 may be made concurrently with a display change in step S439.

According to this embodiment as described above, the tablet 101 sets the highlight condition, transmits it to the video camera 100 in advance, and further transmits the setting change request to the video camera 100. This allows the video camera 100 to determine, based on the highlight condition, whether to highlight the changed contents when receiving the setting change request from the tablet 101. That is, only a change that influences the duty of a cameraman can be highlighted on the side of the video camera 100, allowing the cameraman to concentrate on his own duty. In other words, it becomes possible to notify the user of an image capturing apparatus of only a desired setting item out of changed setting items when the setting of the video camera 100 is changed from the tablet 101.

If a set value outside of an expected range is preset as a highlight condition, highlight can be performed so as to recognize an unexpected setting change thought to be an operation error in a situation where a movie director does shooting while viewing the monitor 104. Furthermore, the tablet 101 receives the setting change result and the highlight result in the video camera 100, and highlights the display element in the video camera 100 in accordance with the reception of the highlight result. This allows the user of the tablet 101 transmitting the setting change request to confirm in the tablet 101 that highlight in the video camera 100 is performed as intended.

Note that above-described various control operations assumed to be performed by the control unit 311 may be performed by one hardware device, or the whole apparatus may be controlled by dividing a process by a plurality of hardware devices.

The present invention has been described in detail based on the preferred embodiments of the present invention. However, the present invention is not limited to these specific embodiments and also includes various modes without departing from the scope of the present invention. Furthermore, each embodiment described above merely shows an embodiment of the present invention, and the respective embodiments can also be combined as needed.

In each embodiment described above, the description has been given by taking a case in which the present invention is applied to the tablet terminal as an example. However, this is not limited to this example, and a communication apparatus capable of operating the image capturing apparatus is applicable. That is, the present invention is applicable to, for example, a personal computer, a PDA, a mobile phone terminal, a portable image viewer, a printer apparatus with a display, a digital photo frame, a music player, a game machine, an electronic book reader, a smartphone, a projection apparatus, home electrical appliances with a display, an on-vehicle apparatus, and a medical system that involves shooting such as an endoscope or a surgery support.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-122878, filed Jun. 21, 2016, which is hereby incorporated by reference herein in its entirety.

What is claimed is:

1. A communication apparatus comprising:
   a communication unit for communication with an image capturing apparatus including a display unit;
   an input unit configured to input a setting change request to the image capturing apparatus; and
   a control unit configured to control the communication unit to transmit, to the image capturing apparatus, second information to be highlighted together with first information indicating contents of the setting change request so as to highlight a display element related to the setting change request when displayed in the display unit of the image capturing apparatus in a case where the contents of the setting change request meet a predetermined condition, and
   control the communication unit to transmit the first information to the image capturing apparatus without transmitting the second information in a case where the contents of the setting change request do not meet the predetermined condition.

2. The apparatus according to claim 1, further comprising a determination unit configured to determine, based on the predetermined condition, whether to highlight the display element related to the setting change when displayed in the display unit of the image capturing apparatus.

3. The apparatus according to claim 1, further comprising a setting unit configured to preset such that contents of a setting change request to the image capturing apparatus in a predetermined range are highlighted in the display unit of the image capturing apparatus,
wherein the predetermined condition includes whether the contents of the setting change request fall within the predetermined range set by the setting unit.

4. The apparatus according to claim 1, wherein the predetermined condition includes whether an input to the input unit is a second operation mode different from a first operation mode.

5. The apparatus according to claim 4, wherein the first operation mode is an operation of pressing the input unit with a weak force smaller than a predetermined threshold, and the second operation mode is an operation of pressing the input unit with a strong force not less than the predetermined threshold.

6. The apparatus according to claim 4, wherein the first operation mode is an operation of pressing the input unit for a time shorter than a predetermined time, and the second operation mode is an operation of pressing the input unit for a time less than the predetermined time.

7. The apparatus according to claim 1, further comprising an information display unit,
wherein the control unit controls the communication unit to receive change result information indicating the display element highlighted in the display unit of the image capturing apparatus, and
wherein the information display unit highlights a display element related to the received change result information.

8. The apparatus according to claim 7, wherein the information display unit is formed integrally with the input unit.

9. The apparatus according to claim 8, wherein highlight of the display element related to the change result information includes at least one of a change in color of the display element, a change in character size, a change in font, and a change in effect and display by an dialogue.

10. A control method of a communication apparatus having a communication unit configured to communicate with an image capturing apparatus including a display unit, the method comprising:
inputting a setting change request to the image capturing apparatus; and
controlling the communication unit to transmit, to the image capturing apparatus, second information to be highlighted together with first information indicating contents of the setting change request so as to highlight a display element related to the setting change request when displayed in the display unit of the image capturing apparatus in a case where the contents of the setting change request meet a predetermined condition, and
controlling the communication unit to transmit the first information to the image capturing apparatus without transmitting the second information in a case where the contents of the setting change request do not meet the predetermined condition.

11. A non-transitory computer-readable storage medium storing a program for causing a computer to execute a control method of a communication apparatus having a communication unit for communication with an image capturing apparatus including a display unit, the method comprising:
inputting a setting change request to the image capturing apparatus; and
controlling the communication unit to transmit, to the image capturing apparatus, second information to be highlighted together with first information indicating contents of the setting change request so as to highlight a display element related to the setting change request when displayed in the display unit of the image capturing apparatus in a case where the contents of the setting change request meet a predetermined condition, and
controlling the communication unit to transmit the first information to the image capturing apparatus without transmitting the second information in a case where the contents of the setting change request do not meet the predetermined condition.

12. An image capturing apparatus comprising:
an image capturing unit;
a display unit;
a reception unit configured to receive information transmitted from a communication apparatus; and
a processing unit configured to make a setting change based on first information indicating contents of a setting change request and highlight the setting change in the display unit in a case where the reception unit receives second information together with the first information when receiving the first information, and
make a setting change based on the first information indicating the contents of the setting change request without highlighting the setting change in the display unit in a case where the reception unit does not receive the second information together with the first information when receiving the first information.

13. An image capturing system comprising a communication apparatus and an image capturing apparatus communicable with the communication apparatus,
wherein the communication apparatus comprises:
a communication unit for communication with the image capturing apparatus including a display unit;
an input unit configured to input a setting change request to the image capturing apparatus; and
a control unit configured to control the communication unit to transmit, to the image capturing apparatus, second information to be highlighted together with first information indicating contents of the setting change request so as to highlight a display element related to the setting change request when displayed in the display unit of the image capturing apparatus in a case where the contents of the setting change request meet a predetermined condition, and
control the communication unit to transmit the first information to the image capturing apparatus without transmitting the second information in a case where the contents of the setting change request do not meet the predetermined condition; and
wherein the image capturing apparatus comprises:
an image capturing unit;
a display unit;
a reception unit configured to receive information transmitted from the communication apparatus; and
a processing unit configured to make a setting change based on first information indicating contents of a setting change request and highlight the setting change in the display unit in a case where the reception unit receives second information together with the first information when receiving the first information, and make a setting change based on the first information indicating the contents of the setting change request without highlighting the setting change in the display unit in a case where the reception unit does not receive the second information together with the first information when receiving the first information.

14. A non-transitory computer-readable storage medium storing a program for causing a computer to execute a control method of an image capturing apparatus comprising an image capturing unit and a display unit, the method comprising:

receiving information transmitted from a communication apparatus; and processing so as to make a setting change based on first information indicating contents of a setting change request and highlight the setting change in the display unit in a case where second information is received together with the first information when the first information is received in the receiving, and make a setting change based on the first information indicating the contents of the setting change request without highlighting the setting change in the display unit in a case where the second information is not received together with the first information when the first information is received in the receiving.

15. A non-transitory computer-readable storage medium storing a program for causing a computer to function as each unit of an image capturing system comprising a communication apparatus and an image capturing apparatus communicable with the communication apparatus, wherein the communication apparatus comprises:

a communication unit for communication with the image capturing apparatus including a display unit;

an input unit configured to input a setting change request to the image capturing apparatus; and a control unit configured to control the communication unit to transmit, to the image capturing apparatus, second information to be highlighted together with first information indicating contents of the setting change request so as to highlight a display element related to the setting change request when displayed in the display unit of the image capturing apparatus in a case where the contents of the setting change request meet a predetermined condition, and control the communication unit to transmit the first information to the image capturing apparatus without transmitting the second information in a case where the contents of the setting change request do not meet the predetermined condition; and wherein the image capturing apparatus comprises:

an image capturing unit;

a display unit;

a reception unit configured to receive information transmitted from the communication apparatus; and a processing unit configured to make a setting change based on first information indicating contents of a setting change request and highlight the setting change in the display unit in a case where the reception unit receives second information together with the first information when receiving the first information, and make a setting change based on the first information indicating the contents of the setting change request without highlighting the setting change in the display unit in a case where the reception unit does not receive the second information together with the first information when receiving the first information.

* * * * *